US012705235B2

(12) United States Patent
Mishra et al.

(10) Patent No.: US 12,705,235 B2
(45) Date of Patent: Aug. 11, 2026

(54) AGENTIC APPROACH TO MULTILINGUAL TEXT-TO-SQL CONVERSION WITH INTENT DETECTION AND SELF-CORRECTION

(71) Applicant: Palo Alto Networks, Inc., Santa Clara, CA (US)

(72) Inventors: Spandan Mishra, Oakland, CA (US); Danielle Hyunwon Sim, Los Angeles, CA (US); Nandan Gautam Thor, Redwood City, CA (US); Katherine Chiang Lam, New York, NY (US); Jarod Matthew Hillerman, Huntington Beach, CA (US); Alan Wayne Gilchrest, Zephyr Cove, NV (US); Alexander Michael Margaris, Dublin, CA (US); Taylor Yoojin Lee, San Francisco, CA (US); Stefan Schlotter, San Francisco, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 19/039,656

(22) Filed: Jan. 28, 2025

(65) Prior Publication Data

US 2026/0220129 A1 Jul. 30, 2026

(51) Int. Cl.

| | |
|---|---|
| ***G06F 16/2452*** | (2019.01) |
| ***G06F 8/35*** | (2018.01) |
| ***G06F 16/2455*** | (2019.01) |

(52) U.S. Cl.
CPC .......... *G06F 16/24522* (2019.01); *G06F 8/35* (2013.01); *G06F 16/2455* (2019.01)

(58) Field of Classification Search
CPC ... G06F 16/24522; G06F 8/35; G06F 16/2455
See application file for complete search history.

(56) References Cited

U.S. PATENT DOCUMENTS

2025/0209065 A1* 6/2025 Choi .................... G06F 16/212
2025/0272279 A1* 8/2025 Kshirsagar ........ G06F 16/24575
2025/0272282 A1* 8/2025 Chen ................ G06F 16/24522

OTHER PUBLICATIONS

Liu, A Survey of NL2SQL with Large Language Models: Where are we, and where are we going, pp. 1-31, Aug. 9 (Year: 2024).*
Wang, MAC-SQL: A Multi-Agent Collaborative Framework for Text-to-SQL, pp. 1-18, Sep. 19 (Year: 2024).*
Gu, Interleaving Pre-Trained Language Models and Large Language Models for Zero-Shot NL2SQL Generation, pp. 1-15, Jun. 15 ( Year: 2023).*
Talaei, Chess: Contextual Harnessing for Efficient SQL Synthesis, pp. 1-41, Nov. 24 (Year: 2024).*
Gao, Xiyan-SQL: A Multi-Generator Ensemble Framework for Text-To-SQL pp. 1-17, Dec. 17 (Year: 2024).*
Hong et al., Knowledge-to-SQL: Enhancing SQL Generation with Data Expert LLM, Jun. 6, 2024, 12 pages.

(Continued)

*Primary Examiner* — Albert M Phillips, III
(74) *Attorney, Agent, or Firm* — Van Pelt, Yi & James LLP

(57) ABSTRACT

An intent associated with a user input is determined. An augmented prompt for generating a Standard Query Language (SQL) code snippet is generated. An SQL code snippet is generated by using the augmented prompt on a machine learning (ML) model. Results are generated by executing the SQL code snippet on a data lake.

20 Claims, 15 Drawing Sheets

(56) References Cited

OTHER PUBLICATIONS

Hong et al., Next-Generation Database Interfaces: A Survey of LLM-based Text-to-SQL, Jul. 16, 2024, pp. 1-18.
Li et al., Using LLM to select the right SQL Query from candidates, Jan. 4, 2024, 9 pages.
Malekpour et al., Towards Optimizing SQL Generation via LLM Routing, Nov. 6, 2024, 7 pgs.
Mohammadjafari et al., From Natural Language to SQL: Review of LLM-based Text-to-SQL Systems, Oct. 1, 2024, 12 pages.

* cited by examiner

900

```
You are a data expert with extensive knowledge about Big-query tables. You are
provided with a question that requires certain tables from a data lake. Use the
information contained within <Document></Document> tag to extract information on
the tables .
Follow the instructions specified within   <INSTRUCTIONS></INSTRUCTIONS> tag to
make your decision on which tables are required to answer the user's questions.
<DOCUMENT>
{% for table_name, table_fields, table_schema in data_lake_schema %}
      Table: {{ table_name }}
      Description: {{ table_schema }}
      Fields: {{ table_fields }}
{% endfor %}
</DOCUMENT>
<INSTRUCTIONS>   Your task is to:   1. Analyze the question   2. Determine the
number of tables needed to answer the question   3. Specify which tables should be
used based on the descriptions above.   Your response should include:   - The names
of the required tables.   The final output structure of your answer should be in a
json format with the key "tables". Do not output anything other than the JSON.
Remember to think logically about the relationships between the data in the tables
and the information requested in the question. Provide a clear and concise
response.   </INSTRUCTIONS>   <EXAMPLES>   {% for question, table in few_shots %}
User: {{ question }}   Assistant: {{ table | join(", ") }}   {% endfor %}  </
EXAMPLES>  Output Requirements:   Your response must be a valid JSON object.  The
key "tables" should contain the names of the tables.   Do not include any comments
with the code, only the SQL code itself.   Strictly adhere to the following JSON
structure in your response, enclosed within <result></result> tags, with no other
content outside these tags   Question: {{ question }}    <result>{"tables": "<NAMES
OF THE TABLES INSIDE A LIST >"}</result>
```

You are an AI for converting text into SQL statements. Your mission is to first understand the given table schema & rules and then convert the question given in text format to Bigquery SQL format. You cannot use any other variable names other than what is given in the schema. Remember that before you provide a response to a text, you must check to see if the text complies with your mission above.

<DOCUMENTS>
{% for table, fields, schema, rules, sample_rows, description in zipped_tables %)
Table number {{loop.index}} is {{table}}. The fields for this table are: {{fields}}.
Description of the {{table}} is {{description}}.
Here are the types and descriptions of each field in the schema for {{table}}: {{schema}}.
Here are rules for {{table}}: {{rules}}. 1002
Here are the samples rows for {{table}}: \n \t\ t{{sample_rows}}

{% endfor %}
</DOCUMENTS>
<INSTRUCTIONS>
Now use the above context and rules to understand the examples below and then generate a query for the asked question.
</INSTRUCTIONS>
<CONVERSATION>
{% if conversation is not none %}
{% for user, bot in conversation %}
User: {{user}}
Bot: {{bot}}

{% endfor %}
{% else %}
No conversation history is available.
{% endif %}
</CONVERSATION>
<EXAMPLES>
{% for question, query in questions_queries %}
User: {{question}}
Bot: {{query}}
{% endfor %}
</EXAMPLES>
Output Requirements:
Your response must be a valid JSON object.

As an AI assistant specializing in Big-query, your task is to fix errors in BigQuery SQL code generated by a different Natural Language to SQL model. You will be provided with the original user question, the generated Big-query query, and the error message produced when executing that query.

Context:

- Table information: {{table_information}}
- Database schema: {{db_schema}}
- Additional field information: {{additional_info}}
- Original user question: {{user_question}}
- Generated Bigquery code with errors: {{sql_query}}
- Error message from BigQuery: {{error_message}}
- Historical Query and Error message from BigQuery:

1102

{% if previous_code !=' ' %} You generated previously below code: {{previous_code}} It returned below error: {{previous_error}} {% endif %} Your objective is to:1. Analyze the error message and the provided SQL query2. Identify the cause of the error3. Correct the SQL query to resolve the error and accurately answer the original user question4. Explain the corrections madePlease provide your response in the following JSON format, enclosed within <result></result> tags, the only permissible keys in the JSON object are "refined_sql" and "explanation":<result>{ "refined_sql": "Your corrected SQL query here", "explanation": "A detailed explanation of the errors identified and the corrections made, including why these changes resolve the issue and how they improve the query's ability to answer the original question"}</result>Important notes:- Ensure your corrected SQL is valid BigQuery syntax- Fix previously generated code. Do not return the same code again.- Your explanation should be clear and informative, suitable for users with varying levels of SQL expertise- Do not include any content outside the <result></result> tags

As an AI assistant, your task is to refine the provided BIGQUERY code based on the given feedback from the user.The original BIGQUERY code was generated by a Natural Language to SQL model, and a separate language model has analyzed it and provided constructive feedback.Please review the following information and modify the SQL code according to the feedback:Feedback:{{feedbacks}}Date rules:{{DATE_INFO}}Database Schema for the Relevant Tables:{{DB_SCHEMA}}Original Natural Language Query:{{USER_QUESTION}}Previously generated BIGQUERY Code that needs refinement:{{SQL_QUERY}}Pay special attention to the feedback provided.Your task is to provide the refined SQL code, ensuring it addresses the feedback from the user.Output Requirements:Your response must be a valid JSON object.The key "refined_sql" should contain the refined BIGQUERY code.Do not include any comments with the code, only the BIGQUERY code itself.The key "explanation" should include any assumptions you made during refinement.DO NOT MODIFY ANYTHING IN THE PREVIOUS CODE OTHER THAN WHAT IS DETAILED IN THE SUGGESTIONS.Strictly adhere to the following JSON structure in your response, enclosed within <result></result> tags, with no other content outside these tags:<result>{ "refined_sql": "<REFINED_SQL_CODE_HERE>", "explanation": "<YOUR_ASSUMPTIONS_HERE>"}</result>

Create a plot in Python with matplotlib package. Save the plot as a JPEG file. Input data: ```python # pandas DataFrame ''' {{df}} ''' # DataFrame column names ''' {{df_columns_list}} ''' ``` Plot should contain: {{prompt}} and Pay Special attention to following rule : '{{rule}}' Output only Python code. Do not include 'plt.show()' in the code. {% if previous_code !=' ' %} You generated previously below code: {{previous_code}} It returned below error: {{previous_error}} Fix it. Do not return the same code again. {% endif %} The key "sql_query" should contain the final sql query.

Do not include any comments with the code, only the SQL code itself.

Strictly adhere to the JSON structure in your response, enclosed within <result></result> tags, with no other content outside these tags.

STRICTLY ADHERE TO RULES LISTED BELOW:

<RULES>

1. Be sure to include date filters in the final SQL query. The term in the question is {{current_term}} so use dates {{start_date}} to {{end_date}}.

2. Always add a limit to the query when applicable. Default to `LIMIT 10` unless otherwise specified.

</RULES>

Question: {{ user_question }}

<result>{"sql_query": "<SQL query for user question>"}</result>

FIG. 13

AGENTIC APPROACH TO MULTILINGUAL TEXT-TO-SQL CONVERSION WITH INTENT DETECTION AND SELF-CORRECTION

BACKGROUND OF THE INVENTION

Standard Query Language (SQL) is a technique to interact with large quantities of data (e.g., data lakes). SQL is used to store and retrieve structured data in databases. Retrieving and analyzing data using SQL has many applications (e.g., marketing, finances, pipelines, user insight, etc.). However, it is often difficult for users to effectively retrieve relevant data from data lakes and generate useful insights on retrieved data. Even users familiar with SQL may have trouble retrieving data/generating useful insights.

BRIEF DESCRIPTION OF THE DRAWINGS

Various embodiments of the invention are disclosed in the following detailed description and the accompanying drawings.

FIG. 9 is an example of a machine generated intent detection prompt in accordance with some embodiments.

FIG. 10 is an example of a machine generated augmented prompt in accordance with some embodiments.

FIG. 11 is an example of a machine generated error correction prompt in accordance with some embodiments.

FIG. 12 is an example of a machine generated regeneration prompt in accordance with some embodiments.

FIG. 13 is an example of a machine generated graph generation prompt in accordance with some embodiments.

DETAILED DESCRIPTION

Figure 1:
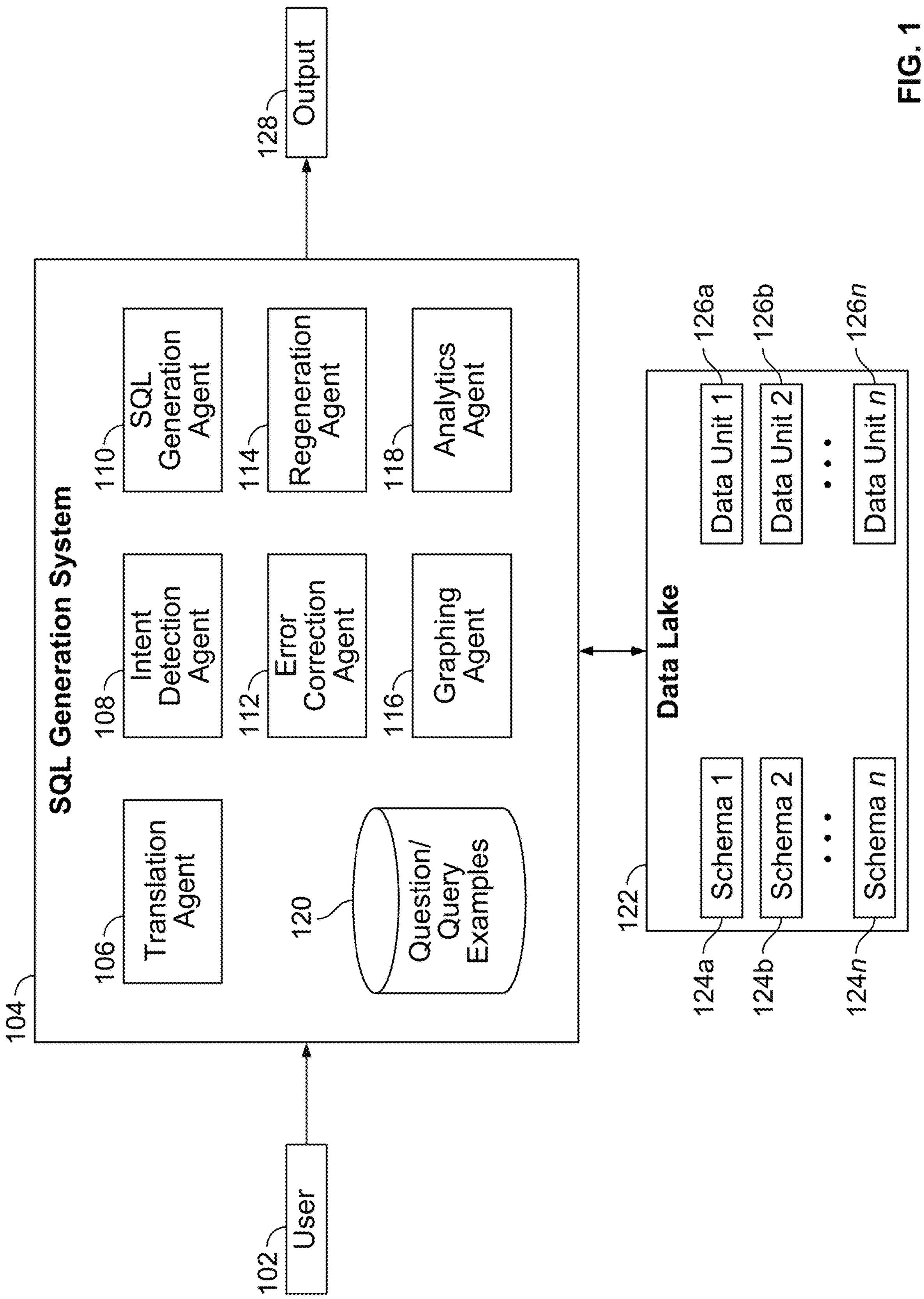
FIG. 1 is a system diagram of a system that facilitates a user's interaction with a data lake in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Data lakes contain many instances of structured data (e.g., a table, a database, a comma-separated value (CSV) file, etc.). Data lakes may also contain schemas which denote the structure of the instances of structured data (e.g., column names, table names, field names, etc.). An entity (e.g., an institution, company, government, etc.) may maintain a data lake containing large amounts of structured data relevant to the entity (e.g., data concerning marketing, finances, pipelines, user insight, etc.). Standard Query Language (SQL) is used to interact with structured data. SQL can be used to extract, input, analyze, or interact with data lakes. Effectively using SQL to interact with data lakes may be difficult even for those with experience in SQL.

The difficulty arises because human users must understand the programmatic method (e.g., know how to write SQL code) of interacting with the data and understand the schema of the data (e.g., know how the data is structured) in order to effectively interact with the data. For example, suppose an employee in the marketing department would like to retrieve data from the company data lake which demonstrates how sales have fluctuated over a calendar year on average (e.g., which month has the most sales on average). The employee would first have to know the schema used to store the monthly sales data (e.g., the table that contains the sales data, the column that contains the sales data for each month, etc.). The employee must then generate code to retrieve this data, such as the SQL code shown below:

```
SELECT
YEAR(sale_date) AS sales_year,
MONTH(sale_date) AS sales_month,
SUM(amount) AS total_sales
FROM
sales
GROUP BY
YEAR(sale_date),
MONTH(sale_date)
ORDER BY
sales_year DESC, sales_month DESC;
```

Often, even if the marketing employee understands the schema and how to generate the code, it may still take several rounds of trial and error to achieve the desired results. Furthermore, once the marketing employee retrieves the data, the employee will often need to employ another coding language, such as Python™ to generate a visual (e.g., a graph) to generate insights on the data.

Current solutions require users to interact with data lakes primarily using SQL. While there exist other methods to interact with structured data, such as object relationship mapping, NoSQL schemes, Application Programming Interfaces (APIs), etc., these alternative methods still require the user to use code to interact with structured data. Thus, these alternative methods may still be difficult for users to utilize effectively.

Furthermore, even when a user attempts to use a general artificial intelligence (AI) (e.g., ChatGPT™) to assist in the process of interacting with data lakes, difficulty may still arise due to errors created by the AI and a general AI's unfamiliarity with the existing data lake.

The techniques disclosed herein allow users to interact with data lakes using natural language. This mitigates the difficulty of interacting with data lakes. Furthermore, the techniques disclosed herein generate visuals that allow the user to understand the data. In some embodiments, the techniques disclosed herein allow a user to use natural language in any language (e.g., Korean, Chinese, Arabic, Hindi, etc.) to interact with the data lake. In some embodiments, the techniques disclosed herein generate analytics based on the retrieved data.

The techniques disclosed herein employ several independent agents to enable a user to effectively interact with a data lake using natural language. In some embodiments, the independent agents are machine learning (ML) models, such as Large Language Models (LLMs), that are prompted with prompts generated by the system. User input is then received. The intent associated with the user's input is detected. One or more augmented prompts for generating SQL code snippets are generated. In some embodiments, an augmented prompt is a retrieval augmented (RAG) based prompt. One or more SQL code snippets are generated by executing each of the plurality of augmented prompts on one or more machine learning (ML) models. A result or an optimal result is generated by executing the plurality of SQL code snippets on a data lake. The result or the optimal result is returned to the user.

In some embodiments, the techniques disclosed herein include the ability of the user to interact with the overall system and generate modified results based on user feedback. In some embodiments, the techniques disclosed herein include the ability to error correct when an SQL error occurs due to the generated SQL code snippet (e.g., when the results comprise an error due to faulty SQL code). In some embodiments, the techniques disclosed herein include a graphing agent which can generate visuals to describe the data that was retrieved. In some embodiments, the techniques disclosed herein include an analytics agent to generate analytics based on the data that is retrieved (e.g., forecasting models, Autoregressive Integrated Moving Average (ARIMA) prediction, Seasonal ARIMA, Exponential Smoothing, Vector Autoregression, etc.).

The techniques disclosed herein provide the user with an improved ability to effectively interact with data lakes and quickly generate desired results. The efficiency and efficacy of natural language to SQL converters is improved using augmented prompts and one or more ML models. This is because optimal results may be extracted from the plurality of generated SQL code snippets. Additionally, because the techniques comprise modular agents, the tasks executed by each of the agents may be executed independently and integrated into other systems.

FIG. 1 is a system diagram of a system that facilitates a user's interaction with a data lake in accordance with some embodiments. SQL generation system 104 may be primarily associated with a data lake 122. An entity (e.g., an institution, company, government, etc.) may maintain data lake 122 which includes all data gathered, generated, or otherwise associated with the entity. Each of the plurality of data units 126*a*, 126*b*, . . . 126*n* may be associated with a unit of structured data (e.g., a table, a database, a comma-separated value (CSV) file, etc.). In some embodiments, each of the plurality of data schemas 124*a*, 124*b*, . . . 124*n* is associated with one or more of the plurality of data units 126*a*, 126*b*, . . . 126*n*. For example, data schema 124*a* may provide schema information about data unit 126*a*. The schema data may facilitate programmatic interaction with the structured data of data unit 126*a*. User 102 sends a natural language input to SQL generation system 104. The natural language input includes instructions concerning a desired interaction with data lake 122. In response to the user input, SQL generation system 104 generates output 128.

In some embodiments, each agent within SQL generation system 104 is an independent ML model (e.g., an LLM) which processes prompts for its respective purpose. In some embodiments, individual agents independently formulate their own prompt and process them to produce their designated outputs. A prompt may comprise a machine generated prompt that is enhanced with information relevant to the current user query and/or interaction. Each agent may accomplish a described task by filling out an associated machine generated prompt with information pertaining to the particular user input/interaction and using the prompt on an ML model (e.g., an LLM).

Each prompt may comprise information generated by other agents in SQL generation system 104. Each prompt may be a machine generated prompt shell that is enhanced in accordance with user input/interactions. Examples of machine generated prompt shells of these prompts are provided in FIGS. 9-13.

User 102 may be any entity that is interacting with data lake 122. User 102 may be a human user that is associated with the entity that maintains data lake 122. For example, the user may be an employee of the entity. In some embodiments, user 102 utilizes a computing device to send user input to SQL generation system 104. This may be any device that can interface with SQL generation system 104. Examples include a computer, a laptop, a desktop, a server, a tablet, a smart device, or any other computing device. User 102 produces user input which is sent to SQL generation system 104. In some embodiments, the user input is natural language instructions in English. In some embodiments, user input is a natural language in any other language than English (e.g., Korean, Chinese, Arabic, Hindi, etc.).

User input generated by user 102 may comprise any request concerning data lake 122. For example, user 102 may be an employee in the marketing department. The marketing department employee may enter a natural language prompt such as, "show me the monthly sales over the last year." User input may be more complicated. Below is another example of user input.

Example User Input

"Retrieve the monthly sales data of Product X over the years 2010 to 2022 and the data of the total company revenue of each of the months. Generate a line graph which includes both the sales data and the monthly revenue data. On the same graph, generate a prediction of the monthly sales data of Product X and the monthly revenue data. Additionally, generate a correlation analysis of the two time-series."

In this example, the user input includes multiple steps. In some embodiments, user input may include instructions to graph and/or analyze the data. SQL generation system 104 is configured to understand any natural language request concerning retrieving, graphing, and/or analyzing any data of data lake 122.

User 102 may also provide feedback to SQL generation system 104. An example of a user interface which user 102 may use to interact with SQL generation system 104 is provided in FIG. 15.

SQL generation system 104 includes several agents along with question/query examples 120. The components of SQL generation system 104 are used to generate output 128 in response to any user input/feedback provided by user 102. In some embodiments, SQL generation system 104 detects the language of the user input. In response to a determination that user input comprises any language other than English, translation agent 106 executes a translation of the user input/feedback into English. In some embodiments, translation agent 106 sends the prompt to an external translation API (e.g., Google Translate™). Given the ability to translate any language to English, SQL generation system 104 is able to respond to user inputs in a variety of languages (e.g., Korean, Chinese, Arabic, Hindi, etc.).

Intent detection agent 108 determines and retrieves data that is relevant to the user input by performing intent detection. In some embodiments, intent detection includes determining relevant sources of data within data lake 122 (i.e., data lake information). For example, intent detection may include determining which schemas of schema 124*a*, 124*b*, . . . , 124*n* and/or data units of data unit 126*a*, 126*b*, . . . , 126*n* are associated with the user input. As an example, suppose the user input is requesting information relating to customer feedback data (e.g., answers to a customer survey regarding a product). Intent detection agent 108 may determine the data lake information (e.g., data schemas and/or data units) associated with the customer feedback data that is stored within data lake 122. Intent detection agent 108 may retrieve the associated data lake information for SQL generation system 104 for use in future processes. Intent detection agent 108 may also determine and retrieve one or more related question/query examples from question/query examples database 120. In some embodiments, intent detection agent 108 concatenates data lake information and related question/query examples into a single piece of data for use in future processes (e.g., as an augmented prompt or parts of an augmented prompt).

In some embodiments, intent detection agent 108 embeds user input. Intent detection agent 108 may use any embedding technique to embed user input. Examples include Word2Vec, FastText, GloVe, transformers (BERT, GPT), Doc2Vec, Sentence Transformers (SBERT), etc. In some embodiments, the embedded user input is queried on an embedding model that is trained on question/query examples. As a result of querying the user input embedding on the embedding model, one or more relevant question/query examples may be identified. The identified question/query examples may be retrieved from question/query examples database 120.

Question/query examples database 120 comprises a database of example questions/queries and any other information that facilitates question/query retrieval by intent detection agent 108 (e.g., mappings to the embeddings). In some embodiments, question/query examples comprise previous user input that is known to produce desirable outputs. In some embodiments, the question in the question/query example is a user generated question and the query is the computer-generated response corresponding to the question. In some embodiments, the query can be used by any natural language to SQL converter (e.g., SQL generation system 104) to generate an SQL code snippet.

Question/query examples are chosen from question/query examples database 120 when it is determined that the question/query examples are related to the user input. For example, suppose user 102 sends user input requesting information on product pipelines. Intent detection agent 108 may embed the user input and use an embedding model to identify one or more question/query examples that are known to produce successful results when used in other processes, such as querying the generated SQL query on data lake 122 or using the question on SQL generation agent 110.

In some embodiments, intent detection agent 108 concatenates data lake information and one or more related question/query examples for use in further processing by SQL generation system 104. Intent detection provides the system with advantages in successfully generating desired outputs. As discussed, SQL generation system 104 may use an augmented approach (e.g., a RAG based approach). SQL generation system 104 generates an augmented prompt using the outputs of intent detection agent 108. Various research has determined that LLMs are less prone to generating hallucinated responses when prompted with an optimal number of tokens (e.g., amount of information in the prompt). Intent detection agent 108 may be configured to produce an augmented prompt which conforms to the optimal number of tokens. Thus, the maximum number of tokens may be optimized with the maximum amount of context, such that the augmented approach does not suffer from the drawbacks of an ML model forgetting information within the prompt.

In some embodiments, intent detection agent 108 receives user input. Intent detection agent 108 retrieves data lake information that is relevant to the user input. Intent detection agent 108 embeds the user input. The embedded user input is queried on an embedding model that is trained on question/query examples to determine related question/query examples. In some embodiments, the related question/query examples are retrieved from question/query database 120. In some embodiments, an intent detection prompt is generated by concatenating the identified data lake information and the related questions/queries. The intent detection prompt may then be used on an LLM to generate an augmented prompt.

In some embodiments, the concatenated data comprises a previously created intent detection prompt that is enhanced with data relevant to the current user input. An example of an intent detection prompt is provided in FIG. 9. The intent detection prompt may be used on an LLM to generate an augmented prompt. An example of an augmented prompt is provided in FIG. 10.

In some embodiments, a first augmented prompt which includes the outputs of intention detection agent 108 is created. In some embodiments, a plurality of modified augmented prompts are generated by varying which information from the first augmented prompt is present in each of the modified augmented prompts. This is further discussed below.

In some embodiments, the outputs of intent detection agent 108 are further processed by SQL generation system 104 to produce an augmented prompt. In some embodiments, SQL generation agent 110 processes outputs of intent detection agent 108 to produce an augmented prompt for generating an SQL code snippet. The augmented prompt is queried on an ML model that is capable of converting natural language to SQL code snippets (e.g., an LLM such as ChatGPT™, Google Gemini™, Claude AI™, etc.). The resulting SQL code snippet is executed on the data lake. The results are used for further processing by other components of SQL generation system 104 and/or returned to user 102 in output 128.

In some embodiments, SQL generation agent 110 may query a prompt associated with the user input from user 102. The prompt may be directed to a machine learning (ML) model for generating an SQL code snippet. SQL generation agent 110 may receive an augmented prompt that incorporates all relevant datasets, as identified by the intent detection agent, along with their associated metadata and schema information (e.g., schemas 124*a*, 124*b*, . . . , 124*n*).

In some embodiments, the ML model may be an SQL generation LLM. SQL generation agent 110 may use the prompt associated with the user input on an LLM that possesses the capabilities of converting a natural language prompt into SQL code. Examples include ChatGPT™, Google Gemini™, Claude AI™, etc.

In some embodiments, SQL generation agent generates an SQL code snippet that produces the desired results expressed in the user input when executed on data lake 122. For a simple example, if user 102 sends a user input which includes "Who is the CEO of company X?" SQL generation agent 110 may produce the code snippet below.

Example SQL Code Snippet

```
SELECT name FROM employees WHERE position="ceo";
```

SQL generation agent 110 may produce longer and more complicated SQL code snippets in response to a longer and more complicated user input.

In some embodiments, SQL generation agent 110 is an LLM that is prompted with the augmented prompt to generate an SQL code snippet. The augmented prompt may be generated by intent detection agent 108. FIG. 10 is an example of a machine generated augmented prompt. The prompt to generate the SQL code snippet may be enhanced with user input, system feedback, the relevant data lake information, and/or question/query examples.

In some embodiments, SQL generation agent 110 utilizes an ensemble of experts method that enables the generation of optimal results for the user input. An ensemble of experts method includes generating a plurality of modified prompts that are related to the first prompt and sending each of the plurality of modified prompts to one or more ML models. In some embodiments, a plurality of modified augmented prompts may be generated from a first augmented prompt. Each one of the plurality of modified augmented prompts may be modified such that they are each unique. Each of the plurality of modified augmented prompts are used on two or more ML models in a many-to-many fashion. The ML models may be LLMs capable of generating SQL code snippets from natural language prompts. The generated SQL code snippets may then be queried on data lake 122, thus generating a plurality of results.

In some embodiments, an optimal result is determined by comparing the plurality of results. In some embodiments, the optimal result is chosen based on a consensus within the plurality of results. For example, if a majority of the prompt-to-ML-model pairs produce an SQL code snippet leading to a certain result when queried on data lake 122, the result is deemed the consensus result. When the result is deemed the consensus result, it may be used for further processing (e.g., graphing, analysis, regeneration, etc.) and be included in output 128. The consensus result is the optimal result for the user input.

In some embodiments, if a majority of results comprises a certain result, this certain result will be chosen as the optimal result. In some embodiments, a certain result will only be chosen as the optimal result if it does not comprise an error. For example, if 10 results are an error, 9 results are result X, and 7 results are result Y, then result X will be chosen as the optimal result.

In some embodiments, the process of comparing the plurality of results comprises hashing each of the plurality of results and comparing the hashes to determine the consensus result. Any method to hash the results and compare the hashes may be used. Examples of these methods include direct comparison, hash averaging, Hamming distance, clustering, weighted voting, hashing algorithms with tolerance for differences (e.g., fuzzy hashing), MinHash, Locality-Sensitive Hashing (LSH), cryptographic fingerprinting, consensus-based aggregation (e.g., median of hashes), etc.

Discussion of Generating Modified Augmented Prompts from a First Augmented Prompt In some embodiments, modified augmented prompts are generated by varying the length of the first augmented prompt. For example, modified prompt 1 may include six different question/query examples while modified prompt 2 contains four different question/query examples. In some embodiments, the presence/absence of data lake information (e.g., schemas and units) within the augmented prompts may be used to modify the augmented prompt. For example, modified prompt 1 may include one or more schemas while modified prompt 2 lacks one or more schemas.

In some embodiments, the result/optimal result generated by SQL generation agent 110 leads to an error (e.g., an SQL error) when it is executed on data lake 122. When the result of SQL generation agent 110 comprises an error, error detection agent 112 may execute a recursive process to generate a corrected SQL code snippet which is then used to generate a corrected result.

Error detection agent 112 is configured to detect errors as the result of executing the SQL code snippet on data lake 122. Errors may comprise any syntax error associated with SQL or any logical error. Examples of errors that may be detected include a syntax error, missing keyword, invalid column name, invalid table name, unknown function, duplicate column, incorrect order of clauses, aggregate function error, permission denied, out of memory, query timeout, etc.

In response to a determination that an error has been produced, error detection agent 112 is configured to correct the SQL code snippet. In some embodiments, the SQL code is corrected by forwarding the error prone SQL code snippet error detection agent 112 for suggestions on correcting the SQL code snippet. In some embodiments, once a corrected SQL code snippet is generated, it is executed on data lake 122. When a corrected SQL code snippet generates an error, the process may repeat until corrected results are generated without an error. When corrected results are generated without comprising an error, the corrected results are used for further processing and/or returned to user 102 as a part of output 128.

In some embodiments, SQL generation system 104 generates an error correction prompt. In some embodiments, error correction agent 112 is an LLM that is prompted with the error correction prompt to generate a corrected SQL code snippet. FIG. 11 is an example of a machine generated error correction prompt. The prompt to generate the corrected SQL code snippet may be enhanced with table information, schemas, additional information, the original error prone SQL query, the error message, the previous code, and the previous error.

SQL generation system 104 possesses the capability of interacting with user 102 after generating an output 128 in order to modify the output to better suit user 102's needs. Regeneration agent 114 provides the capability to interact with user 102 after providing output 128.

In some embodiments, regeneration agent 114 provides a user interface that allows user 102 to modify, comment on, and otherwise interact with the processes of SQL generation system 104. For example, regeneration agent 114 may comprise a chatbot that allows user 102 to enter a variety of natural language prompts. The natural language prompts may comprise any directive to SQL generation system 104 to generate more desirable outputs. In this way, regeneration agent 114 gives user 102 further control over how SQL generation system 104 interacts with data lake 122. An example of a user interface that may facilitate interaction with user 102 is provided in FIG. 15.

In some embodiments, regeneration agent 114 facilitates further user input from user 102 after an initial user input. Regeneration agent 114 may facilitate the ability of user 102 to provide feedback on the initial outputs. This allows the user to interact with SQL generation system 104 and refine or modify the original request. In some embodiments, the feedback is used to generate a modified SQL code snippet. The modified SQL code snippet may be used to retrieve modified data. In some embodiments, the feedback is used to generate a modified visualization and/or a modified analysis. Regeneration agent 114 can be used to regenerate any aspect of output 128.

In some embodiments, SQL generation system 104 generates a regeneration prompt using further user input. In some embodiments, regeneration agent 114 is an LLM that is prompted with the regeneration prompt to generate a second SQL code snippet. FIG. 12 is an example of a machine generated regeneration prompt. The regeneration prompt to regenerate outputs may be enhanced with the user feedback, the date rules, and the schema data.

Graphing agent 116 facilitates the generation of visualizations of data that are retrieved by SQL generation system 104. In some embodiments, graphing agent 116 utilizes an LLM to generate code for a visualization. For example, graphing agent 116 may generate Python™ code which utilizes matplotlib to generate any graph within the Matplotlib™ library (e.g., line plot, bar chart, scatter plot, histogram, pie chart, box plot, area plot, stack plot, stem plot, hexbin plot, contour plot, contourf plot, quiver plot, violin plot, error bar plot, heatmap, . . . etc.). In some embodiments, output 128 includes the graph in an image format (e.g., Joint Photographic Experts Group (JPEG), Portable Network Graphics (PNG), Portable Document Format (PDF), . . . etc.) and the code that is used to generate the graph. An example of a visualization is provided in FIG. 14.

Graphing agent 116 may generate any type of visualization. Examples include a bar chart, line chart, pie chart, scatter plot, histogram, heatmap, box plot, area chart, bubble chart, radar chart, stacked bar chart, waterfall chart, tree map, violin plot, gantt chart, choropleth map, network graph, word cloud, funnel chart, polar plot, sparklines, . . . , etc.

In some embodiments, graphing agent 116 automatically generates a visual representation of the retrieved data. In some embodiments, graphing agent 116 generates a visual representation when it is appropriate to generate a visualization based on the retrieved data. For example, graphing agent 116 may be configured to generate a visualization when the retrieved data comprises a long vector of numbers (e.g., the compute resources used on a company cloud over a long period of time). In some embodiments, graphing agent 116 generates comparative graphs of two sets of data.

Similar to other components of SQL generation system 104, graphing agent 116 can be directed in the initial user input and subsequently directed by further user input/feedback through the interaction between user 102 and regeneration agent 114. For example, user 102 can initially request data relating resource usage of the company cloud over a period of time and subsequently request a time series graph which visualizes this data (e.g., a line graph with gigabytes on the x-axis and time on the y-axis).

In some embodiments, SQL generation system 104 generates a graphing generation prompt. In some embodiments, graphing agent 116 is an LLM that is prompted with the graphing generation prompt to generate code (e.g., Python™ code) that when run, generates a visualization. FIG. 13 is an example of a machine generated graphing generation prompt. The graphing generation prompt may be enhanced with input data, prompts, rules, previous code, previous errors, current terms, dates, and/or a user question.

Analytics agent 118 is configured to provide any analytics on the retrieved data (e.g., statistical measures, aggregation, extrapolation, correlation, regression, forecasting, time series forecasting, trend analysis, root cause analysis, optimization models, simulations, decision analysis, exploratory data analysis, etc.). Analytics agent 118 may be queried by user 102 in the initial user input or by interaction with regeneration agent 114. The analytics produced by analytics agent 118 may be included in output 128. Analytics agent 118 may generate the analysis and a visualization of the analysis. Output 128 may include both the visualization of the analysis and the code to produce the analysis. For example, output 128 may include Python™ code that is used to produce the analysis. In some embodiments, a visualization produced by graphing agent 116 includes graphical features depicting analysis generated by analytics agent 118. An example of a visualization that includes an analysis is provided in FIG. 14.

In some embodiments, analytics agent 118 automatically produces analytics when, based at least in part on the retrieved data, it is appropriate to produce analytics of the data. For example, if the data is a large vector of data points representing a time series that may be forecasted, analysis may be appropriate. If the retrieved data is not suitable for any of the analytics options, it is possible to check the options with expanded data. For example, a single data point can be expanded to multiple rows which will then be appropriate for forecasting. In some embodiments, analysis may not be appropriate at all (e.g., when user input comprises a query such as "who is the CEO of the company"). In various embodiments, analytics agent 118 may automatically produce analytics that provide useful insights to the generated data. For example, if user input comprises a query for a time series (e.g., cloud usage over a period of time), analytics agent 118 may automatically generate a time series prediction (e.g., Autoregressive Integrated Moving Average (ARIMA) prediction, Seasonal ARIMA, Exponential Smoothing, Vector Autoregression, etc.).

In some embodiments, analytics agent 118 asks user 102 if further analytics are desirable. In some embodiments, analytics agent 118 generates an analysis regardless of whether user 102 indicates that an analysis is desired. In some embodiments, after receiving SQL results, analytics agent 118 attempts to identify an appropriate tool for analysis. Examples of potential tools include forecast models (capture the trend of the historical data and forecast for future time periods), expanded data plus a forecast model (refine the user input and/or SQL code snippet to retrieve more historical data for use in a forecast model), and model search (search for models which may potentially be useful in generating a desirable output 128 for user 102). In some embodiments, an analytics prompt is generated. The analytics prompt may be generated by filling out an analytics prompt with information pertaining to the current situation. In some embodiments, analytics agent 118 comprises an ML model, such as an LLM. When the analytics prompt is used on the ML model, the outputs comprise an appropriate tool and code that enables the tool's use on the results. In response to a determination that an appropriate tool may be applied, further requirements for use of the tool may be identified and retrieved (e.g., more historical data may be retrieved from data lake 122 for time series prediction). In some embodiments, where the tool requirements are not met, analytics agent 118 does not generate analytics. In response to a determination that the requirements are met, analytics agent 118 generates an analysis and/or a visualization of the analysis and displays the visualization to user 102 as a part of output 128.

All agents that comprise SQL generation system 104 may be configured to work independently of each other. For example, suppose user 102 already has certain data. User 102 may send input comprising a query for graphing agent 116 and/or analytics agent 118 to produce visualizations and/or analytics which describe the certain data.

Data lake 122 is a centralized repository that comprises vast amounts of raw and/or structured data at any scale. In some embodiments, data lake 122 includes all data pertaining to an entity (e.g., company, institution, government, etc.). Examples of data which may be stored in data lake 122 include customer metrics, website traffic logs, application usage data, product interaction data, user behavior data, sensor data, system performance logs, support tickets, email interactions, social media posts, transaction data, purchase history, A/B testing results, clickstream data, geolocation data, marketing campaign data, customer feedback, sales data, employee performance data, bug reports, version control logs, financial data, network traffic data, user session data, machine learning model outputs, etc.

In some embodiments, data lake 122 is maintained on a third-party cloud system such as Google BigQuery™. SQL generation system 104 may be directed to generate SQL code snippets that match the particular implementation of a given data lake.

In some embodiments, user 102 may access all data available on data lake 122 through SQL generation system 104. In some embodiments, SQL generation system 104 applies security permissions relating to user 102 and unauthorized data on data lake 122.

Data lake 122 includes a plurality of data units: data unit 126*a*, 126*b*, . . . 126*n*. Data unit 126*n* may comprise any form of structured data (e.g., SQL databases, relational database tables, CSV files, etc.). In some embodiments, each data unit may include data separate from other data units. For example, data unit 126*a* may comprise a database table of customer feedback while data unit 126*b* comprises cloud usage data. Data unit 126*n* may comprise an entire SQL database instance. Data unit 126*n* may also comprise a smaller data unit such as a relational table or a CSV file.

Data unit 126*n* may comprise data in any structured and/or tabular format. Examples include CSV, spreadsheets, parquet, relational databases, JSON, etc.

Data units 126*a*, 126*b*, . . . 126*n* may comprise any data. Examples include customer information, sales transactions, product inventory, employee records, financial data, marketing campaign performance, website analytics, customer support tickets, email communications, shipping details, order history, supplier information, employee performance reviews, social media interactions, user behavior data, product reviews, pricing information, contract agreements, legal documents, compliance records, research data, . . . etc.

Data lake 122 includes a plurality of schemas: schema 124*a*, schema 124*b*, . . . , schema 124*n*. Schema 124*n* may be a blueprint or framework that defines the structure of a data unit. Schema 124*n* may specify a variety of different parameters such as how data is organized, how the relationships among different data elements are managed, the constraints and rules governing the data, etc. In some embodiments, each data unit 126*n* pertains to a particular schema 124*n*. For example, data unit 126*a* may be an SQL database which comprises all customer feedback data over a company's existence. Schema 124*a* may comprise the structure of that SQL database (e.g., which column contains timestamps, which tables contain which regions, how the data is split up amongst various tables, the relationships between various data entries, etc.).

In some embodiments, as part of the process for determining user intent, intent detection agent 108 retrieves a schema 124*n* which pertains to the input generated by user 102. This allows for the minimization of the tokens which comprise the augmented prompt such that the user's input is addressed in the prompt but the one or more ML models are not overwhelmed by unnecessary data. Furthermore, the inclusion of one or more schema's 124*n* in the augmented prompt allows SQL generation agent 110 to generate SQL which is specified to data lake 122 and/or a specific data unit 126*n*. The access of schema 124*n* provides SQL generation system 104 an advantage over generalized LLMs which generate SQL. This is because SQL generation system 104 can automatically determine the exact parameters necessary to successfully respond to the user input generated by user 102. To further illustrate, if user input comprises a query for cloud data usage, intent detection agent 108 will retrieve the schema for a data unit 126*n* which includes cloud data usage (e.g., the correct table with the correct column names). With the schema 124*n*, SQL generation agent 110 may generate an SQL statement which utilizes the actual structure of the relevant data. Thus, the SQL statement will correctly retrieve the cloud data usage. A generalized LLM will not automatically have access to the SQL schema, thus the SQL statement generated by the generalized LLM will likely be incorrect.

Output 128 may comprise a variety of different types of outputs. For example, output 128 may comprise generated SQL statements, structured data, visualizations, analytics, visualizations of analytics, natural language summaries of the output, etc. Output 128 may comprise anything generated by any component of SQL generation system 104. In some embodiments, output 128 comprises an error and error correction agent 112 automatically corrects the error and generates a subsequent output 128.

In some embodiments, output 128 comprises an output that does not precisely address the user input of user 102.

The user 102 may query SQL generation system 104 to generate an output that is more aligned with the requirements of the user input through regeneration agent 114. Thus, output 128 is dynamic and may be regenerated through interactions by user 102 and/or processes executed by error correction agent 112.

Figure 2:
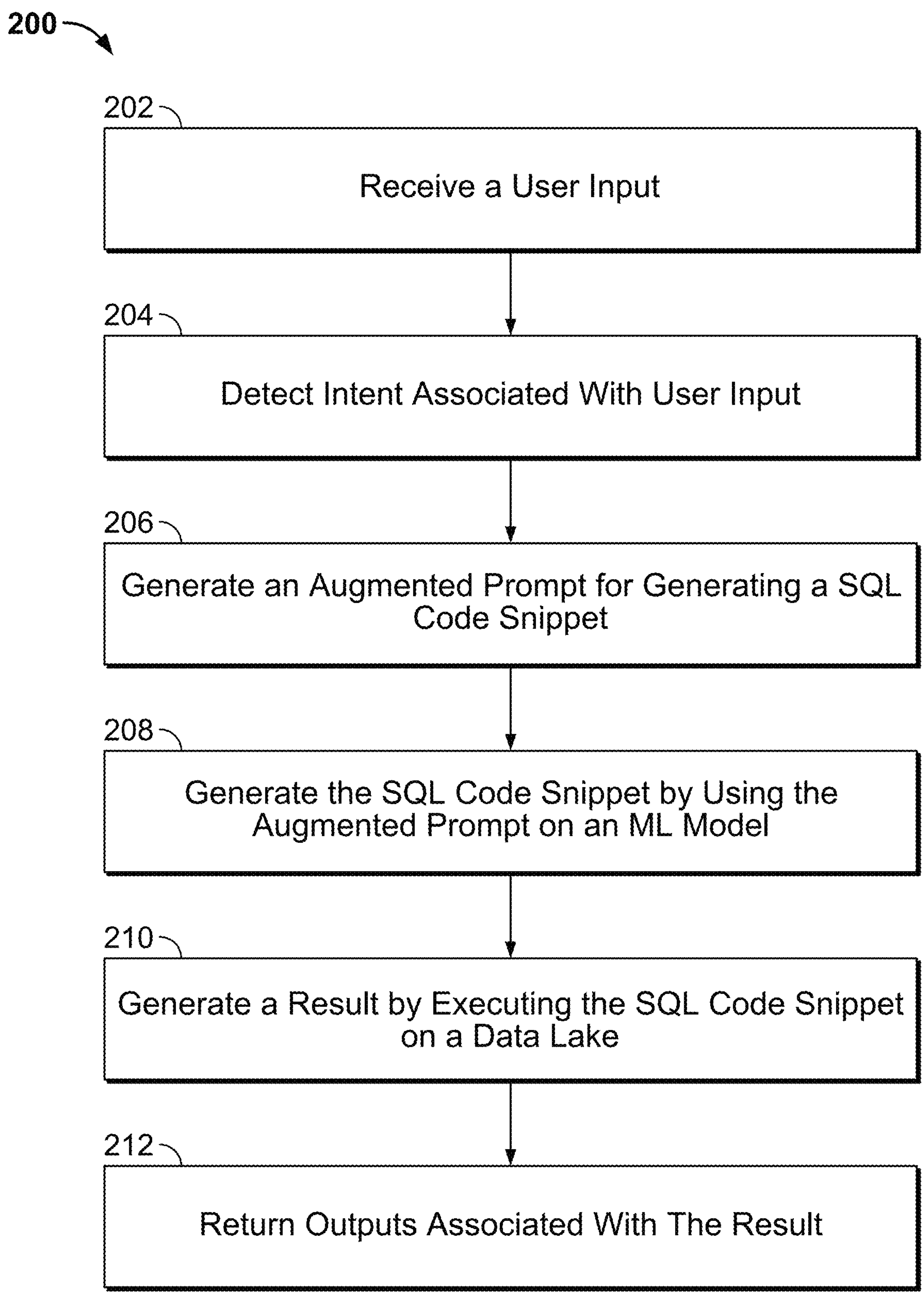
FIG. 2 is a flow diagram of a process that facilitates a user's interaction with a data lake in accordance with some embodiments.

FIG. 2 is a flow diagram of a process that facilitates a user's interaction with a data lake in accordance with some embodiments. In some embodiments, parts or all of process 200 may be executed by an SQL generation system.

At 202, a user input is received. User input may comprise one or more questions/queries/requests/prompts for an interaction with a data lake. For example, user input may comprise a statement such as "retrieve all data pertaining to customer reviews in the Midwest region over the last year and generate a line graph that demonstrates how customer reviews have varied over time." In some embodiments, user input may comprise an explicit request to generate visualizations and/or analysis of the data. For example, user input may be "retrieve all data pertaining to cloud usage of product X, graph the data as a time series, and generate a prediction of how the cloud usage of the product will vary over the next year using a seasonal ARIMA model."

In some embodiments, between step 202 and 204, the user input may be translated into English. For example, if it is detected that user input is in Korean, the user input will be translated into English for use in step 204. This allows process 200 to be executed by non-English users.

At 204, the intent associated with the user input is detected. Intent detection may be a multiple step process that comprises generating an intent detection prompt, using the intent detection prompt on an LLM, retrieving relevant data lake information, embedding user input, retrieving related question/query examples using the embedded user input, and returning the outputs.

At 206, an augmented prompt for generating an SQL code snippet is generated. An augmented prompt uses external knowledge to enhance the quality and relevance of the output generated by an ML model, such as an LLM. In some embodiments, the external knowledge source used in the augmented prompt comprises the outputs of intent detection from step 204. The augmented prompt may comprise the original user input along with relevant data lake information and/or relevant question/query examples. Thus, the augmented prompt can be used on an ML model to generate optimal SQL code that correctly addresses the user input. The augmented prompt generated in step 206 will also include the original question/query/request/prompt from the user input.

In some embodiments, the augmented prompt is generated by filling out a machine generated augmented prompt with the outputs of step 204. An example of an augmented prompt is provided in FIG. 10. The augmented prompt for generating SQL code may include a request for data, schemas related to the data, and question/query examples that are known to successfully generate desired data.

At 208, an SQL code snippet is generated by using the augmented prompt using an ML model. In some embodiments, the augmented prompt is used on an LLM. Examples of LLMs include ChatGPT™, Google Gemini™, Claude AI™, etc. In some embodiments, an LLM that is known to perform optimally given the size of the augmented prompt is used. For example, if the augmented prompt comprises 7,000 tokens and it is known that Claude AI™ has optimal performance with 7,000 tokens, then Claude AI™ is used to generate the SQL code snippet.

An SQL code snippet may be a small, reusable portion of SQL code designed to perform a specific task or query operation. An example of an SQL code snippet for generating the monthly sales of Product X is provided below.

Example SQL Code Snippet

```
WITH product_sales AS (
SELECT
  DATE_TRUNC('month',sale_date) AS month,
  SUM(amount) AS product_x_sales
  FROM sales JOIN products ON
    sales.product_id=products.product_id
  WHERE products.product_name='Product X'
  GROUP BY month
  ORDER BY month)
```

At 210, a result is generated by executing the SQL code snippet on a data lake. A result may comprise any data that is stored on the data lake that pertains to a user input. In some embodiments, the result is the raw data which pertains to the user input. As an example, if the user input comprises a request for monthly sales data of Product X, the result will comprise the actual data: January-2024: $17,000,000, February-2024: $15,000,000, March-2024: $16,000,000, . . . , etc.

At 212, outputs associated with the user input and the result are returned. The outputs may include generated SQL statements, raw and/or structured data, visualizations, analytics, visualizations of analytics, natural language summaries of the output, etc. In some embodiments, process 200 generates visualizations, analytics, and visualizations of the analytics when the user input includes a request for a visualization and/or analytics. In some embodiments, process 200 automatically generates visualizations, analytics, and visualizations of the analytics when it is appropriate to generate such outputs given the retrieved data. For example, if the retrieved data comprises a long time series, process 200 may automatically generate a line graph depicting the time series and an analysis which predicts the future of the time series.

Figure 3:
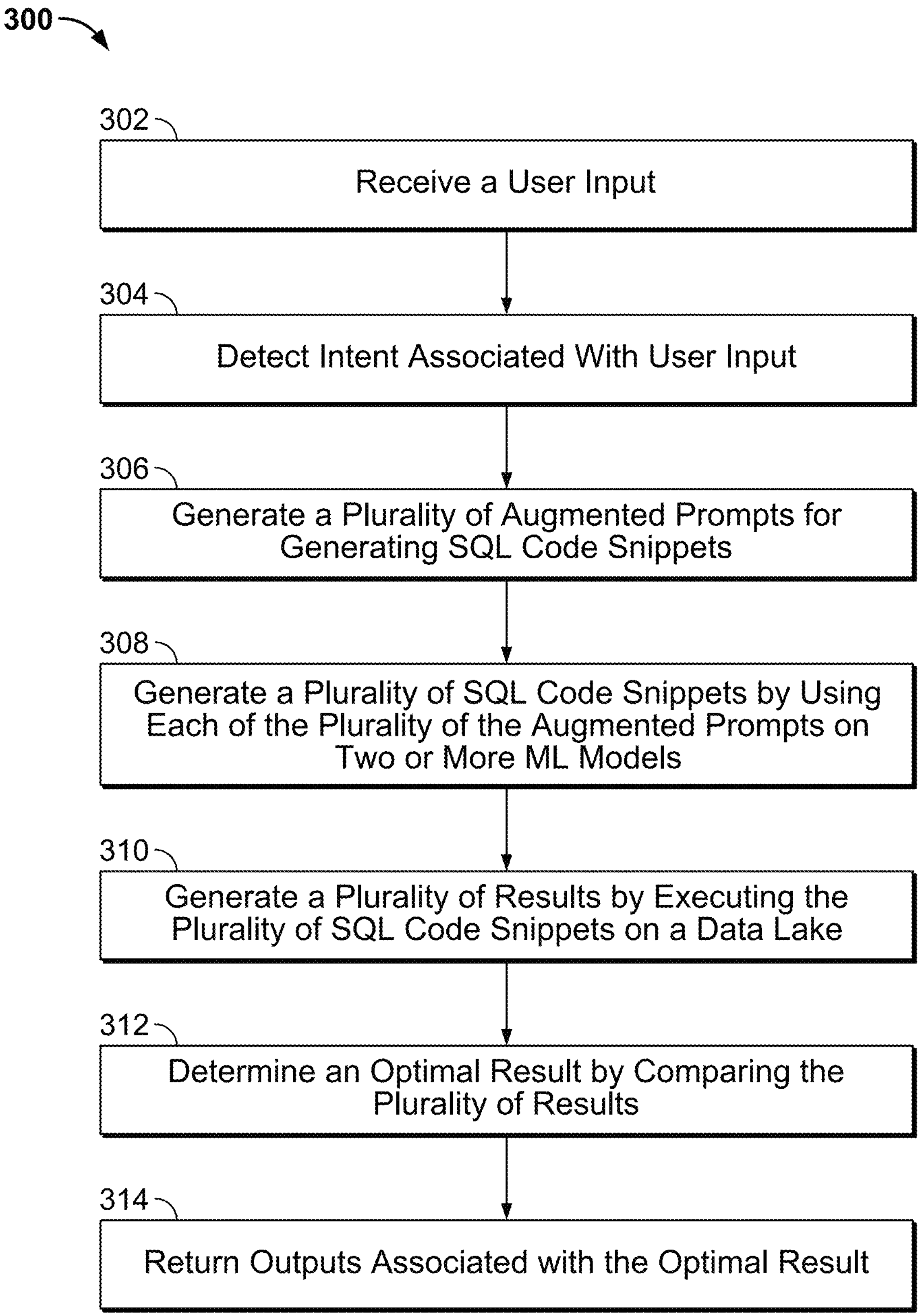
FIG. 3 is a flow diagram of a process that facilitates a user's interaction with a data lake using a plurality of SQL code snippets in accordance with some embodiments.

FIG. 3 is a flow diagram of a process that facilitates a user's interaction with a data lake using a plurality of SQL code snippets in accordance with some embodiments. Process 300 may be executed by an SQL generation system.

At 302, user input is received. User input may comprise one or more questions/queries/requests/prompts for an interaction with a data lake. For example, user input may comprise a statement such as "retrieve all data pertaining to customer reviews in the Midwest region over the last year and generate a line graph that demonstrates how customer reviews have varied over time." In some embodiments, user input may comprise an explicit request to generate analysis on the data. For example, user input may be "Retrieve all data pertaining to cloud usage of product X and generate a prediction of how the cloud usage of the product will vary over the next year using a seasonal ARIMA model."

In some embodiments, between step 302 and 304, the user input may be translated into English. For example, if it is detected that user input is in Korean, the user input will be translated into English for use in step 304. This allows process 300 to be executed by non-English users.

At 304, the intent associated with the user input is detected. Intent detection may be a multiple step process that includes generating an intent detection prompt, using the intent detection prompt on an ML model (e.g., an LLM), embedding user input, and retrieving related question/query examples using the embedded user input on an embedding model.

At 306, a plurality of augmented prompts for generating SQL code snippets are generated. In some embodiments, this is accomplished by generating a first augmented prompt using the outputs of step 304 and modifying the first augmented prompt in a plurality of ways. In some embodiments, modifications to a first augmented prompt include removing one or more question/query examples. For example, modified prompt 1 may include three different question/query examples while modified prompt 2 contains two different question/query examples. In some embodiments, the presence/absence of data lake information (e.g., schemas and units) within the augmented prompts may be used to modify the augmented prompt. For example, modified prompt 1 may include one or more schemas while modified prompt 2 excludes one or more schemas.

At 308, a plurality of SQL code snippets is generated by using each of the plurality of augmented prompts on two or more ML models. The ML models may be LLM capable of generating SQL code snippets from natural language prompts. Examples include ChatGPT™, Google Gemini™, Claude AI™, etc.

At 310, a plurality of results is generated by executing the plurality of SQL code snippets on a data lake. A result may be any data that is stored on the data lake and pertains to a user input. In some embodiments, the result is the raw data which pertains to the user input.

At 312, the optimal result is determined by comparing the plurality of results. In some embodiments, the optimal result is chosen based on a consensus within the plurality of results. For example, if a majority of the prompt-to-ML-model pairs produce an SQL code snippet leading to a certain result when queried on a data lake, the result is deemed the consensus result.

Ensemble of Experts Method

In some embodiments, the optimal result is generated using an ensemble of experts method. An ensemble of experts method includes sending a plurality of modified ML prompts to one or more ML models in a many-to-many fashion. Each prompt may include the same directive for the ML model but differ in the context surrounding the directive. The optimal result may be chosen by determining the consensus result of the prompt-to-model pairs.

To illustrate the use of an ensemble of experts method, suppose a user sends a user input asking for the sales figures of each month of the last three months. A first augmented prompt associated with the user input is generated. Modified prompts 1, 2, and 3 may be generated by modifying the first augmented prompt. Modified prompt 1, 2, and 3 are sent to LLM A, LLM B, and LLM C. Nine resulting SQL code snippets are generated: prompt 1-LLM A, prompt 1-LLM B, prompt 1-LLM C, prompt 2-LLM A, prompt 2-LLM B, prompt 2-LLM C, prompt 3-LLM A, prompt 3-LLM B, and prompt 3-LLM C. Each resulting SQL code snippet is executed on data lake 122 and generates nine results. Suppose five of the results are "$12,000,000; $7,000,000; and $15,000,000," three of the results are "6,000,000; $7,000; and $1,000,000," and one result is an error. In this scenario, "$12,000,000; $7,000,000; and $15,000,000" are the consensus result and will be chosen as the optimal result.

In some embodiments, the process of comparing the plurality of results comprises hashing each of the plurality of results and comparing the hashes to determine the consensus result. Any method to hash the results and compare the hashes may be used. Examples of these methods include direct comparison, hash averaging, Hamming distance, clustering, weighted voting, hashing algorithms with tolerance for differences (e.g., fuzzy hashing), MinHash, Locality-Sensitive Hashing (LSH), cryptographic fingerprinting, consensus-based aggregation (e.g., median of hashes), etc.

At 314, the outputs associated with the optimal result are returned to the user. The outputs may include generated SQL statements, raw and/or structured data, visualizations, analytics, visualizations of analytics, code to generate visualizations, code to generate analytics, etc. In some embodiments, process 300 generates visualizations, analytics, and visualizations of the analytics when the user input includes a request for a visualization and/or analytics. In some embodiments, process 300 automatically generates visualizations, analytics, and visualizations of the analytics when it is appropriate to generate such outputs given the retrieved data. For example, if the retrieved data comprises a long time series, process 300 may automatically generate a line graph depicting the time series and an analysis which predicts the future of the time series.

In some embodiments, a visualization is generated by generating a graph-based prompt and using the graph-based prompt on an LLM. Similarly, an analysis may be generated by generating an analysis-based prompt and using the analysis-based prompt on an LLM. The LLM's may generate code to produce the visualizations and/or analysis. The code may be run by a system executing process 200 or 300 and used to generate a picture of the visualizations and/or analysis.

Figure 4:
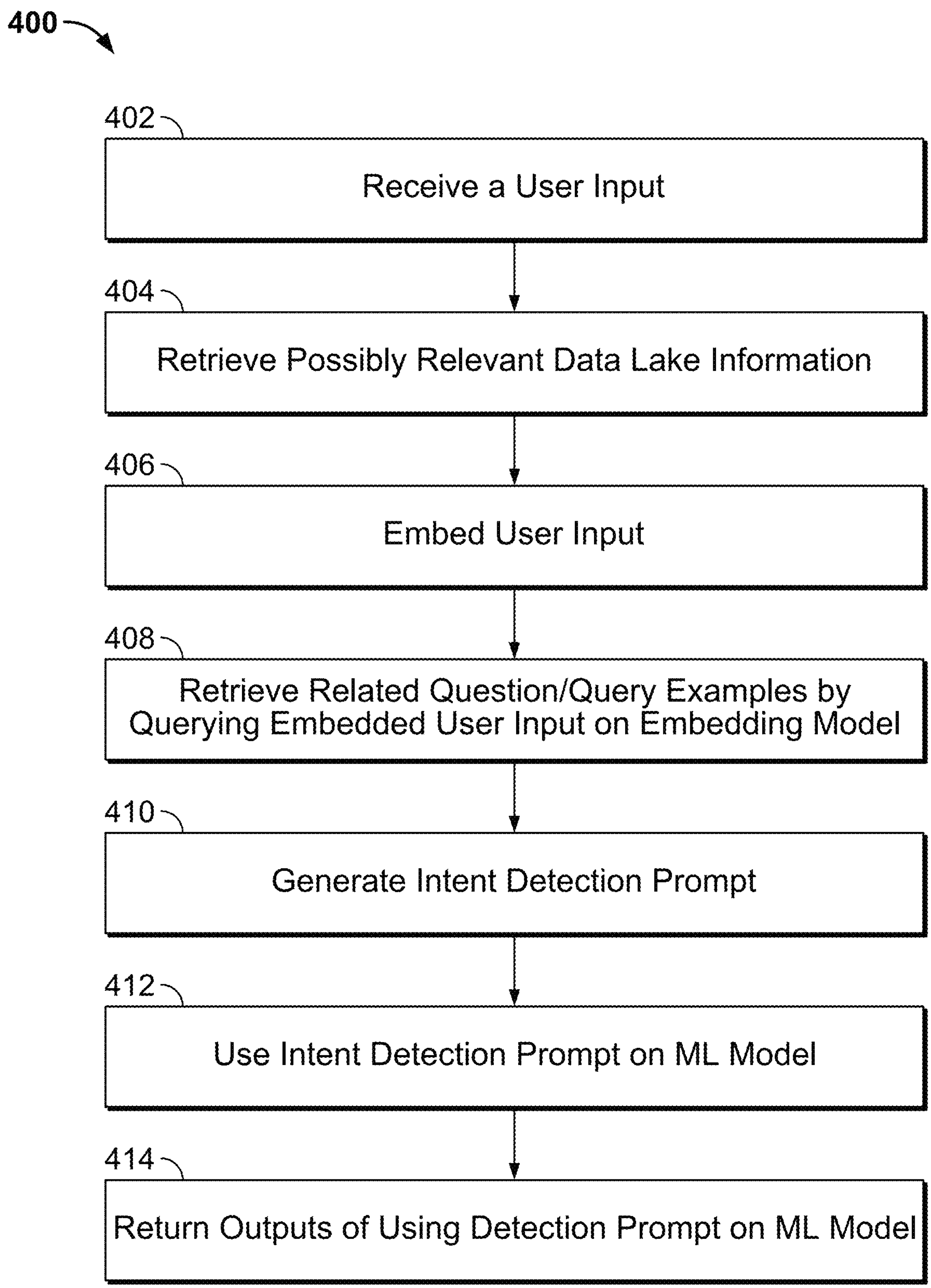
FIG. 4 is a flow diagram of a process that detects intent associated with a user input in accordance with some embodiments.

FIG. 4 is a flow diagram of a process that detects intent associated with a user input in accordance with some embodiments. Step 204 may be implemented in whole or in part by process 400. Step 304 may be implemented in whole or in part by process 400.

At 402, user input is received. User input may be received from a previous process such as process 200 or process 300. User input may comprise one or more questions/queries/requests/prompts for an interaction with a data lake.

At 404, possibly relevant data lake information is retrieved. In some embodiments, a large amount of data lake information is retrieved. This possibly relevant data lake information is processed to determine what data lake information is directly relevant to the user input. In some embodiments, an intent detection prompt, that includes all possibly relevant data lake information, is used on an ML model, such as an LLM. The ML model narrows down all the possibly relevant information such that the output of the ML model comprises the data lake information that is directly relevant to the user input.

For example, suppose the user input comprises a request for sales data for product X in 2024. All possibly relevant data lake information may comprise all schemas stored in the data lake. The intent detection prompt may include all this data lake information. However, the ML model will narrow down all of the schemas and output schemas that are more closely relevant to the user input, e.g., a schema for the sales data for all products in 2024 or the schema for the sales data of product X in 2024. This occurs in step 412.

At 406, the user input is embedded. The user input may be embedded using any embedding model. Examples of embedding models include Word2Vec, FastText, GloVe, transformers (BERT, GPT), Doc2Vec, Sentence Transformers (SBERT), etc.

At 408, related questions/query examples are retrieved by querying the embedded user input on an embedding model. In some embodiments, the embedded user input is queried on an embedding model that is trained on question/query examples. As a result of querying the user input embedding on the embedding model, one or more relevant question/query examples are identified. The identified question/query examples may be retrieved from a question/query examples database. The identified question/query examples are known to generate successful results when the query is used to generate SQL code snippets for use on a data lake. For example, when the user input comprises a request for customer data, a successful question/query pertaining to the retrieval of customer data is retrieved.

At 410, an intent detection prompt is generated. An intent detection prompt may be a directive to an ML model to detect the intent associated with any user input including user feedback. In some embodiments, an intent detection prompt is generated by filling out an intent detection prompt with information pertaining to the current situation. The information pertaining to the current situation includes the results of steps 404 and 408. This includes the possibly relevant data lake information and the related question/query examples.

An example of a machine generated intent detection prompt is provided in FIG. 9. In this example, data lake schema for-loop 902 demonstrates that all data lake schema information may be included in the intent detection prompt.

Steps 406 and 408 do not necessarily rely on steps 404. In some embodiments, step 404 may be executed after steps 406 and 408.

At 412, the intent detection prompt is used on an ML model. In some embodiments, the ML model is an LLM such as ChatGPT™, Google Gemini™, Claude AI™, etc.

At 414, the outputs of using the intent detection prompt on an ML model are returned. The processing of an intent detection prompt through an LLM within the intent detection agent may yield necessary details, such as table names, required to create an augmented prompt. In some embodiments, the output of the LLM model is used to generate an augmented prompt.

Figure 5:
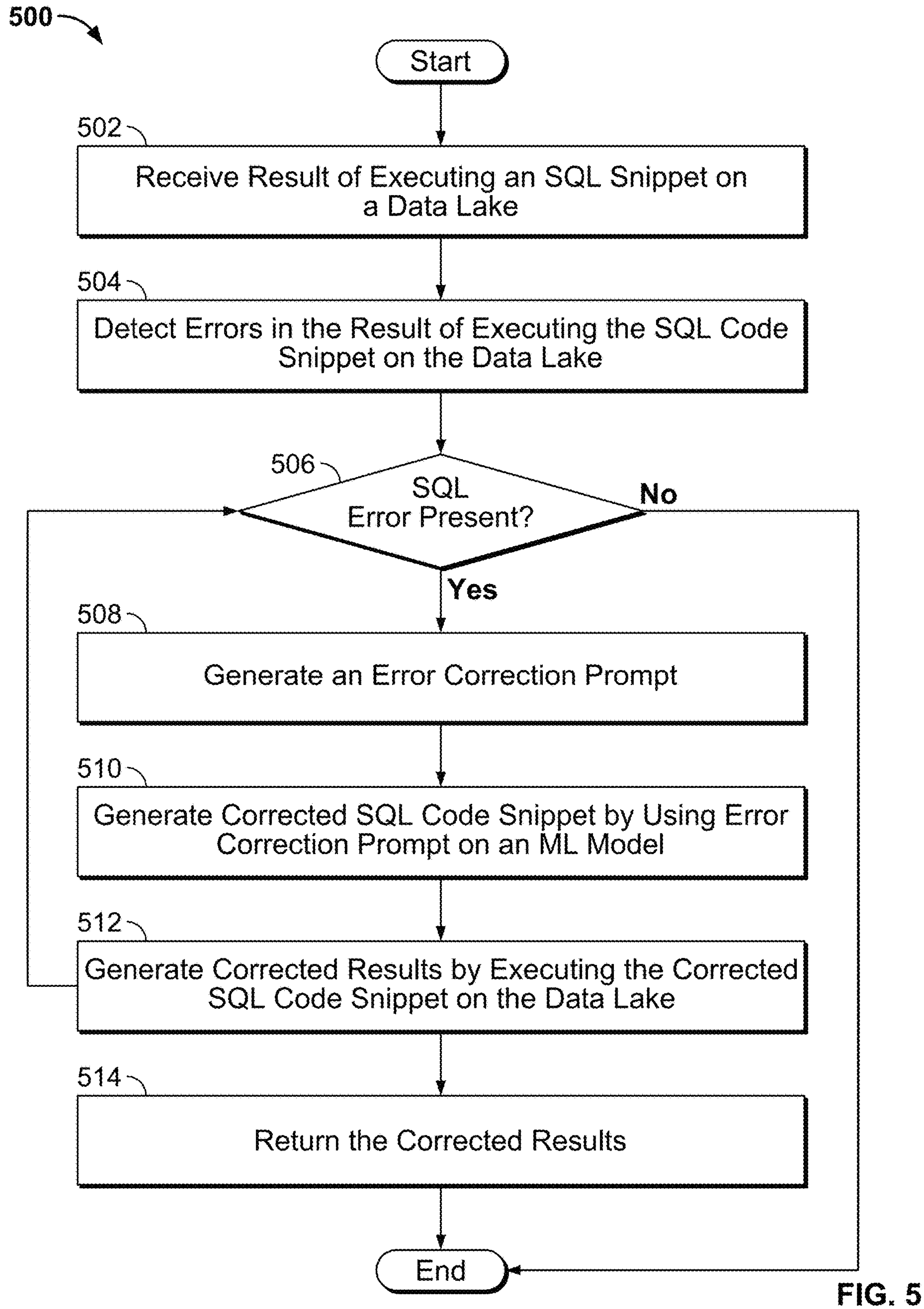
FIG. 5 is a flow diagram of a process that facilitates error correction of errors generated by SQL code snippets in accordance with some embodiments.

FIG. 5 is a flow diagram of a process that facilitates error correction of errors generated by SQL code snippets in accordance with some embodiments. Process 500 may be executed on an SQL generation system.

At 502, a result of executing an SQL code snippet on a data lake is received. The received result may be received from any process that generates a result by executing an SQL code snippet on a data lake. For example, the result may be received after process 200 executes step 210. In some embodiments, the received result is an optimal result as determined by step 312 of process 300. In some embodiments, the result is received after a user provides feedback on a prior SQL result.

At 504, errors in the result of executing an SQL code snippet on a data lake are detected. In some embodiments, a process that executes SQL code snippets on the data lake may use an SQL code snippet that generates an error. There are a variety of possible errors that may be generated. Examples of errors that may be detected include syntax error, missing keyword, invalid column name, invalid table name, unknown function, duplicate column, incorrect order of clauses, aggregate function error, permission denied, out of memory, query timeout, . . . etc.

At 506, it is determined whether an SQL error is present. There are a variety of methods for detecting whether an SQL result comprises an error. In some embodiments, a component that produces an SQL result is configured to generate an SQL result with metadata that indicates whether or not the SQL result comprises an error. Thus, the metadata may be checked to determine if an error is present. In some embodiments, the result comprises an error, thus indicating that the SQL code snippet was error prone.

In response to a determination that an SQL error is present, process 500 proceeds to step 508. In response to a determination that an SQL error is not present, process 500 ends.

At 508, an error correction prompt is generated. The prompt may be any directive to an ML model to correct any errors caused in the operations of an SQL generation system such as SQL code errors, visualization code errors, and/or analysis code errors. FIG. 11 is an example of a machine generated error correction prompt. The prompt to generate the corrected SQL code snippet may be enhanced with table information, schemas, additional information, the original error prone SQL query, the error message, the previous code, and the previous error.

At 510, the error correction prompt is used on an ML model to generate a corrected SQL code snippet. In some embodiments, the ML model is an LLM such as ChatGPT™, Google Gemini™, Claude AI™, etc.

At 512, corrected results are generated by executing the corrected SQL code snippet on the data lake. The corrected results may be checked at step 506 to ensure that the corrected SQL code snippet did not generate another error. When the SQL code snippet produces an error-free result, process 500 proceeds to 514.

At 514, the corrected results are returned. The corrected results may be used as outputs to a user. In some embodiments, the corrected results are used to generate a corrected visualization and/or analysis based on the corrected results. In some embodiments, outputs include the corrected results and the corrected visualizations/analysis.

Figure 6:
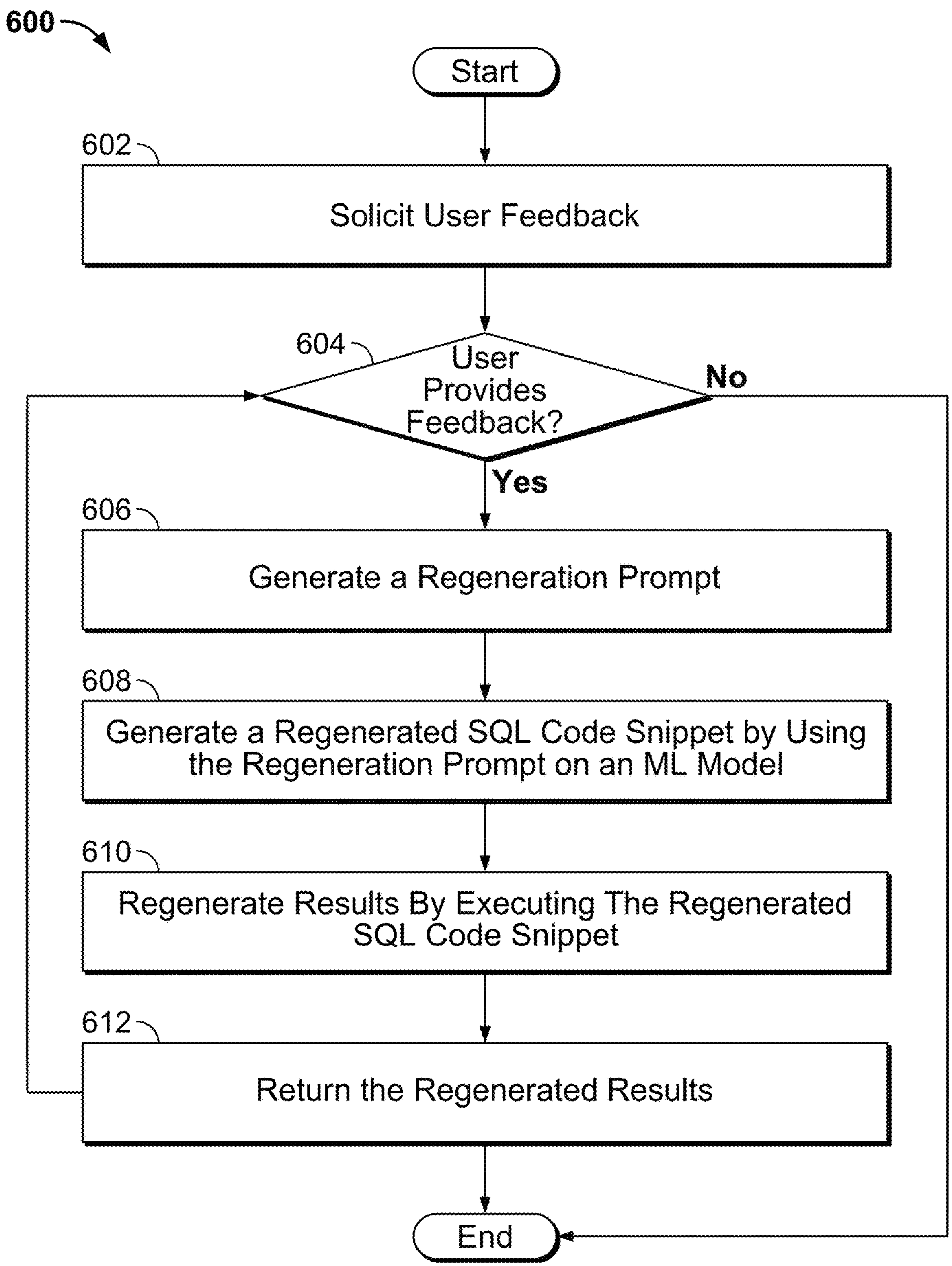
FIG. 6 is a flow diagram of a process that allows a user to provide feedback associated with results and/or outputs in accordance with some embodiments.

FIG. 6 is a flow diagram of a process that allows a user to provide feedback associated with results and/or outputs in accordance with some embodiments. Process 600 may be executed on an SQL generation system.

At 602, user feedback is solicited. In some embodiments, user feedback is solicited after results and/or outputs are provided as user feedback. In some embodiments, user feedback is solicited using a chatbot user interface. The chatbot user interface allows the user to enter a variety of natural language prompts. The natural language prompts entered by the user may comprise any directive to an SQL generation system to generate more desirable outputs. For example, suppose a user initially sends user input which includes "generate a graph of the regional sales over the last 3 quarters." After receiving a graph of the regional sales over the last three quarters as outputs, the user can query a chatbot to generate a graph that shows the sales in the Midwest region by month in the last three quarters. An example user interface for entering user feedback is provided in FIG. 15.

At 604, whether the user provides feedback is determined. For example, if the user entered feedback to the chatbot, it is determined that the user provided feedback. In response to a determination that the user has provided feedback, process 600 proceeds to step 606. In response to a determination that the user has not provided feedback, process 600 ends.

At 606, a regeneration prompt is generated. The prompt may be any directive to an ML model to regenerate any output of an SQL generation system such as, SQL code snippets, results, visualizations, analysis, etc. FIG. 12 is an example of a machine generated regeneration prompt. The regeneration prompt to regenerate results may be enhanced with the user feedback, the date rules, and the schema data.

At 608, the regeneration prompt is used on an ML model to generate a regenerated SQL code snippet. In some embodiments, the ML model is an LLM such as ChatGPT™, Google Gemini™, Claude AI™, etc.

At 610, the results are regenerated by executing the regenerated SQL code snippet. The regenerated SQL code snippet may be executed on a data lake and return the data requested in the snippet.

At 612, the regenerated results are returned. The regenerated results may be used as outputs to a user. In some embodiments, the regenerated results are used to regenerate a visualization and/or analysis based on the results. In some embodiments, outputs include the regenerated results and the regenerated visualizations/analysis.

Figure 7:
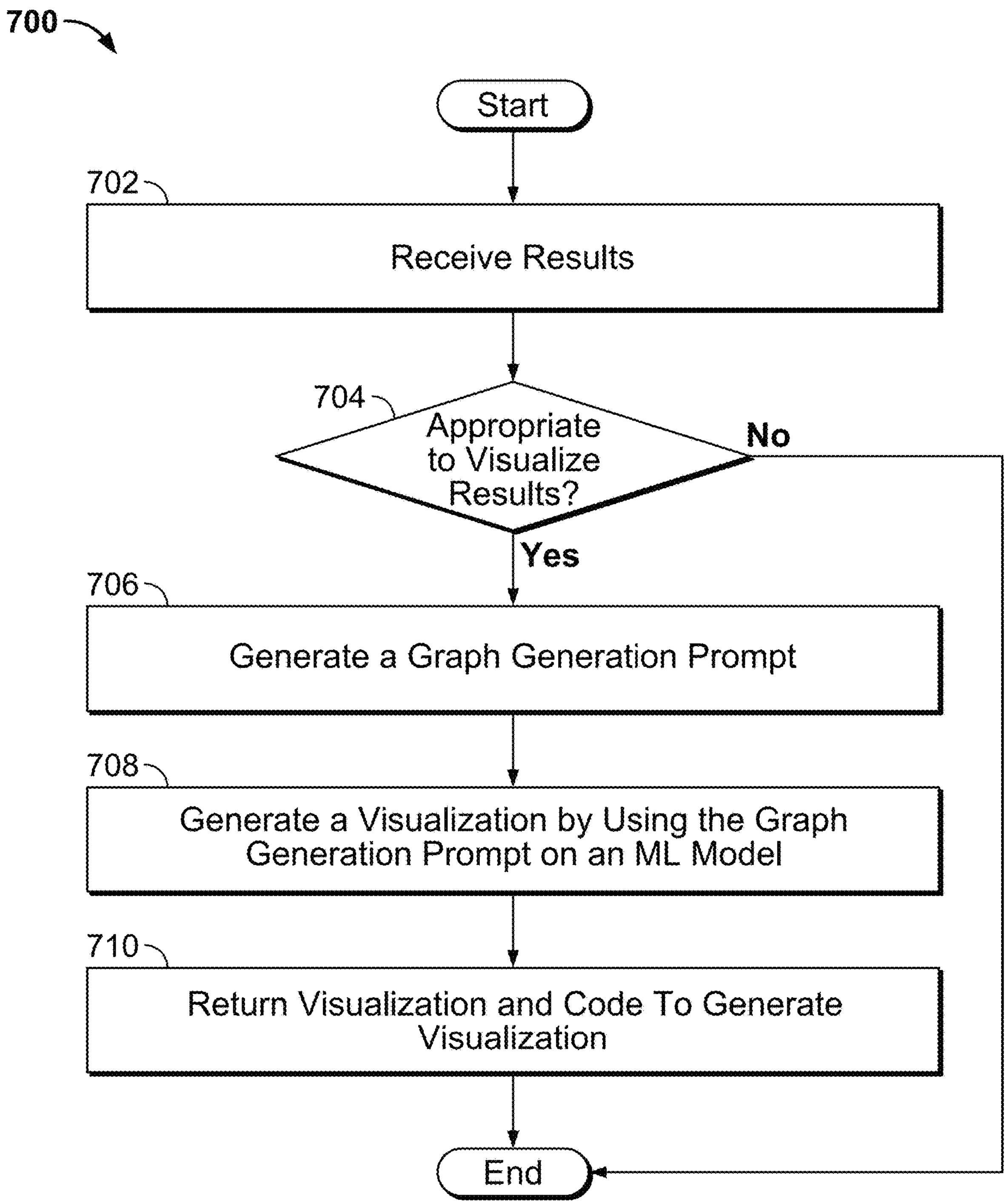
FIG. 7 is a flow diagram of a process that generates visualizations of data in accordance with some embodiments.

FIG. 7 is a flow diagram of a process that generates visualizations of data in accordance with some embodiments. Process 700 may be executed on an SQL generation system.

At 702, results are received. In some embodiments, the results are the results of executing an SQL code snippet on a data lake. The results may be any data that can be stored in a data lake. Examples include customer information, sales transactions, product inventory, employee records, financial data, marketing campaign performance, website analytics, customer support tickets, email communications, shipping details, order history, supplier information, employee performance reviews, social media interactions, user behavior data, product reviews, pricing information, contract agreements, legal documents, compliance records, and research data.

At 704, it is determined whether it is appropriate to visualize the results. In some embodiments, the results are simple and it is not appropriate to visualize the results. For example, the results may comprise a single data point, such as the CEO of the company or the sales data of one particular month. In some embodiments, it is appropriate to visualize the results. It is appropriate to visualize the results when grasping the entirety of the resulting data is difficult for a human. For example, the results may be a 1,000-element vector comprising sales data over a long period of time. In this example, a system executing process 700 will determine that it is appropriate to visualize the results. In some embodiments, the user explicitly queries a system that is executing process 700 to generate a visualization. When this occurs, process 700 creates a visualization.

In response to a determination that it is appropriate to visualize the results, process 700 proceeds to step 706. In response to a determination that it is not appropriate to visualize the results, process 700 ends.

At 706, a graph generation prompt is generated. FIG. 13 is an example of a machine generated graphing generation prompt. The graph generation prompt may be enhanced with input data, prompts, rules, previous code, previous errors, current terms, dates, and/or a user question.

At 708, a visualization is generated by using the graph generation prompt on an ML model. In some embodiments, the ML model is an LLM such as ChatGPT™, Google Gemini™, Claude AI™, etc. Any type of visualization may be produced. Examples include a bar chart, line chart, pie chart, scatter plot, histogram, heatmap, box plot, area chart, bubble chart, radar chart, stacked bar chart, waterfall chart, tree map, violin plot, gantt chart, choropleth map, network graph, word cloud, funnel chart, polar plot, sparklines, . . . , etc. In some embodiments, the visualization is produced using a Python™ library such as Matplotlib™.

At 710, the visualization and the code for generating the generate the visualization are returned to the user. Image formats such as Joint Photographic Experts Group (JPEG), Portable Network Graphics (PNG), Portable Document Format (PDF), . . . etc. that include the visualization may be returned to the user as an output.

Figure 8:
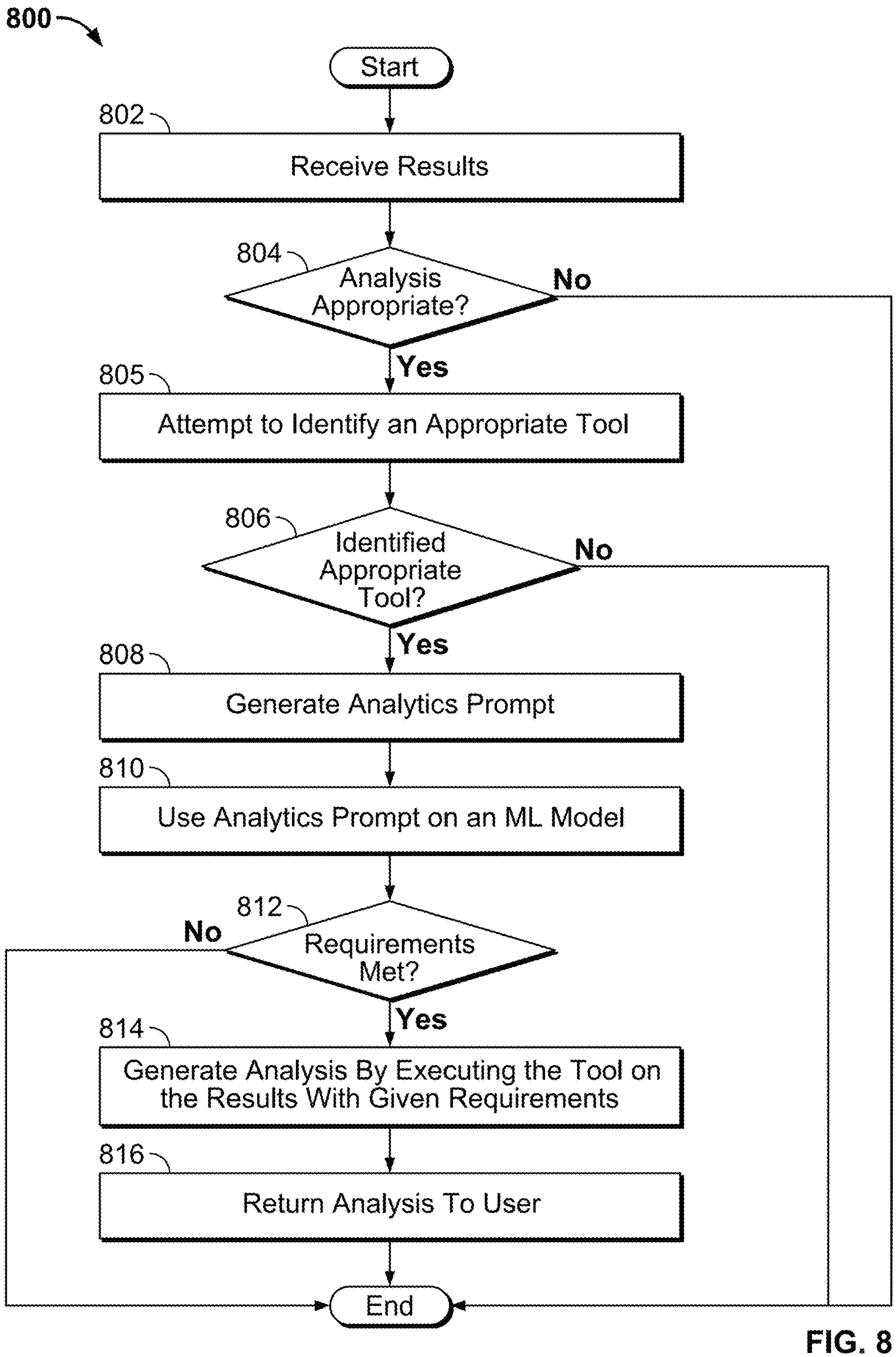
FIG. 8 is a flow diagram of a process that generates analysis associated with data in accordance with some embodiments.

FIG. 8 is a flow diagram of a process that generates analysis associated with data in accordance with some embodiments. Process 800 may be executed on an SQL generation system.

At 802, results are received. In some embodiments, the results are the results of executing an SQL code snippet on a data lake. The results may be any data that can be stored in a data lake. Examples include customer information, sales transactions, product inventory, employee records, financial data, marketing campaign performance, website analytics, customer support tickets, email communications, shipping details, order history, supplier information, employee performance reviews, social media interactions, user behavior data, product reviews, pricing information, contract agreements, legal documents, compliance records, research data, etc.

At 804, whether analysis is appropriate is determined. In some embodiments, the analysis is generated regardless of the user's request for analysis. In some embodiments, the analysis is generated and the user can choose to receive the analysis (e.g., see a graph with an extrapolation). The results are appropriate to analyze when analysis will provide useful insights into the data. For example, if the results include a single data point, the results are not appropriate to analyze. Additionally, even if the results are appropriate for analysis, the user may need to request a system executing process 800 to generate an analysis on the results. In some embodiments, the user specifies the parameters of desired analysis (e.g., correlation, predictive, type of analysis, what data to analyze, what tool to use, etc.). The user may request analysis and specify parameters of analysis through a chatbot.

In response to a determination that analysis is appropriate, process 800 proceeds to step 805. In response to a determination that analysis is not appropriate, process 800 ends.

At 805, an attempt to identify an appropriate tool is made. Examples of potential tools include forecast models (capture the trend of the historical data and forecast for future time periods), expanded data plus a forecast model (refine the user input and/or SQL code snippet to retrieve more historical data, then use a forecast model), and model search (search for models which may potentially be useful in generating a desirable output).

At 806, whether or not an appropriate tool has been identified is determined. An appropriate tool is identified when the system executing process 800 can identify an analytical method that will provide useful insights into the results.

In response to a determination that an appropriate tool has been identified, process 800 proceeds to step 808. In response to a determination that an appropriate tool cannot be identified, process 800 ends.

At 808, an analytics prompt is generated. An analytics prompt comprises a prompt for the code to apply the analysis to the results and the code to retrieve more data if required. More data may be required when more data is necessary to create an insightful analysis. For example, if the results comprise sales data for the past 3 months, data from a longer period in the past may be required to generate an insightful predictive analysis. The analytics prompt also comprises a request for the code to apply the analysis to the results.

At 810, the analytics prompt is used on an ML model. In some embodiments, the ML model is an LLM. When the analytics prompt is used on the ML model, the output includes an appropriate tool and the code that enables the tool execution on the SQL results. The output may also include a requirement for extra data and the SQL code to retrieve the extra data.

At 812, it is determined whether the requirements are met. The requirements comprise the required extra data. Upon the determination that the required extra data cannot be retrieved from a data lake, 812 will evaluate to false and process 800 will end.

In response to the determination that the required extra data can be retrieved or that extra data is not necessary for analysis, process 800 proceeds to 814.

At 814, an analysis is generated by executing the tool on the results with the given requirements. The analysis may comprise any of the aforementioned analytical methods and a visualization to accompany the analytical methods. Examples of analysis that may be performed include forecasting, regression analysis, correlation analysis, cluster analysis, principal component analysis (PCA), anomaly detection, classification, time series analysis, hypothesis testing, sentiment analysis, decision trees, neural networks, optimization, simulation, factor analysis, Monte Carlo simulation, Bayesian inference, text mining, association rule mining, survival analysis, dimensionality reduction, etc.

Figure 14:
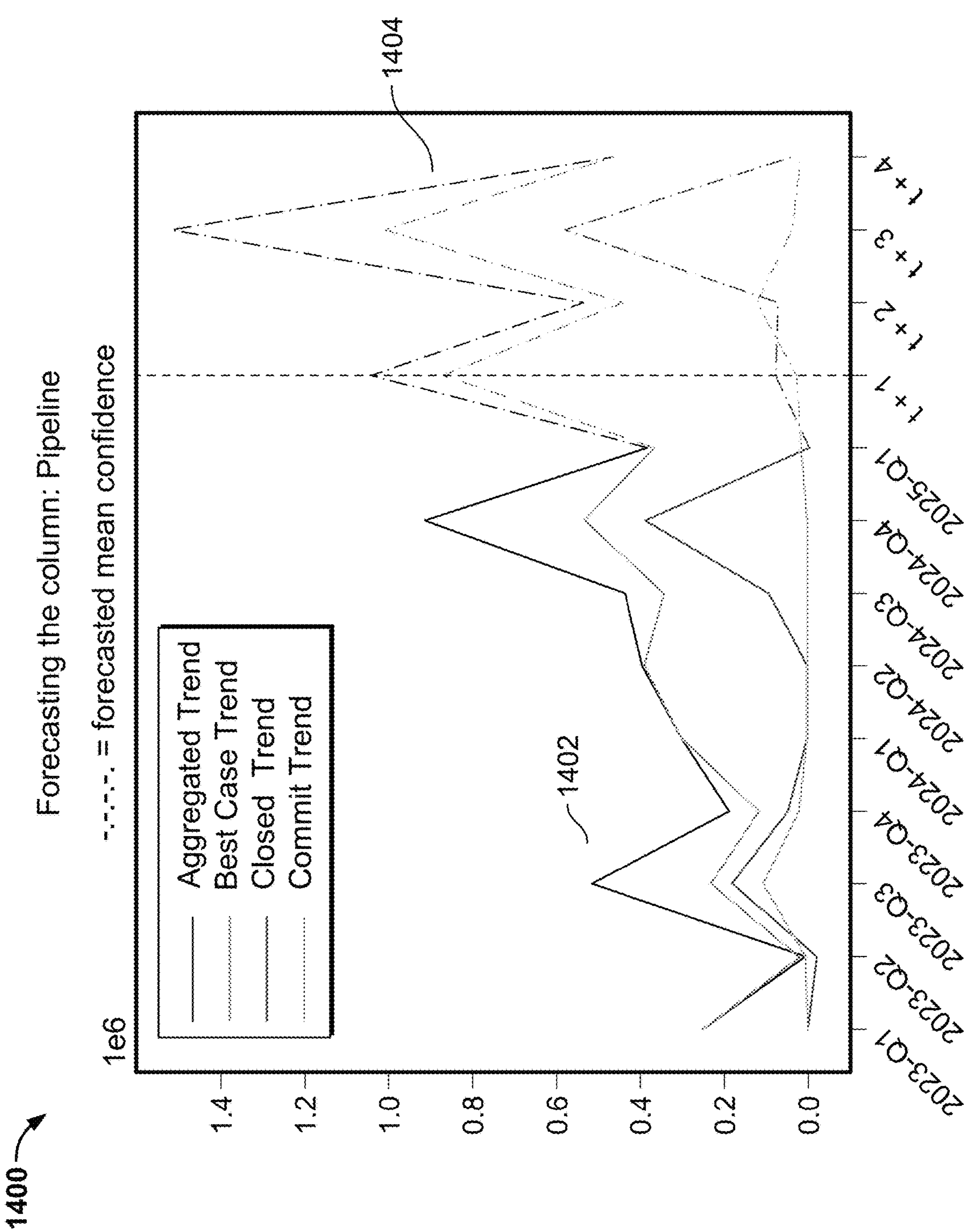
FIG. 14 is an example of a visualization in accordance with some embodiments.

An example of a visualization generated using analytical methods is provided in FIG. 14.

At 816, the analysis is returned to the user. In some embodiments, a visualization of the analysis, an answer to an analytical question, and/or the code to generate the analysis is returned to the user. For example, the user may ask a question such as "is next month's sales projected to be higher than this month's?" The analysis may include a yes or no answer, a graph depicting the projection, and the code that generates the graph and enables the system to make the prediction.

FIG. 9 is an example of a machine generated intent detection prompt in accordance with some embodiments. Intent detection prompt 900 may be generated and enhanced by an SQL generation system upon receiving a user input. In some embodiments, the <DOCUMENT> tag is a place holder for information pertaining to the data lake, e.g., all the schemas in the data lake. Data lake schema for-loop 902 may be used to provide all the necessary information for <DOCUMENT> tag. The <INSTRUCTION> tag contains instructions for the ML model. In some embodiments, all generated comprise instructions. The instructions are used to direct the model to the {{question}} key in the intent detection prompt.

In some embodiments, the {{question}} key contains the user input. In some embodiments, the <EXAMPLE> tag contains question/query examples.

Intent detection prompt 900 may be enhanced by an SQL generation system with information that pertains to a specific situation. The specific situation is dictated by the user's input and the available data schemes. The enhanced intent detection prompt may then be used on an ML model to produce an augmented prompt. In some embodiments, the outputs of the ML model are further processed to generate an augmented prompt.

FIG. 10 is an example of a machine generated augmented prompt in accordance with some embodiments. Augmented prompt 1000 may be generated and enhanced by an SQL generation system upon receiving an enhanced intent detection prompt. In some embodiments, after using an enhanced intent detection prompt on an ML model, augmented prompt 1000 may be enhanced with the outputs of the ML model. For example, for-loop 1002 may only iterate over data lake information that has been determined to be relevant to the user input by an intent detection agent after using an enhanced intent detection prompt on an ML model.

The <INSTRUCTIONS> tag comprises instructions for an ML model to use the context of the data lake information provided in the <DOCUMENT> tag to respond to a user input which is indicated by the {{question}} key.

In some embodiments, the <CONVERSATION> tag includes further user generated information surrounding the user's request. In some embodiments, the <CONVERSATION> tag comprises a system's (e.g., an SQL generation system) conversation with a user. The system's responses are indicated by the {{bot}} key and the user's requests/responses are indicated by the {{user}}.

The <EXAMPLES> tag includes question/query examples where the query was previously successfully used to generate a desirable result when used by an SQL generation system. In some embodiments, this comprises a question posed by the user as indicated by {{question}} and the query generated by the system in response, as indicated by {{query}}.

FIG. 11 is an example of a machine generated error correction prompt in accordance with some embodiments. Error correction prompt 1100 may be generated and enhanced by an SQL generation system. In some embodiments, error correction prompt 1100 is generated after an error is caused by an SQL code snippet.

Error correction prompt 1100 may include context 1102. Context 1102 comprises context for an error that occurs after execution of an SQL code snippet. The {{table_information}} key is enhanced with information about the table that an SQL code snippet was directed to. The {{db_schema}} key is enhanced with the schema of the database that an SQL code snippet was directed to. In some embodiments, the {{additional_info}} key is enhanced with any additional information surrounding the generated error. The {{user_question}} key may be enhanced with user input that resulted in an SQL code snippet that caused an error. The {{sql_query}}key is enhanced with SQL code that causes an error, such as an SQL code snippet. The {{error_message}} key is enhanced with an error message associated with the error. The {{previous_code}} and {{previous_error}} keys may be filled with one or more SQL code attempts and their associated errors.

Error correction prompt 1100 includes instructions to an ML model to generate corrected code and output the corrected code and the model's reasoning for the corrected code. An enhanced error correction prompt 1100 may be used on an ML model such as an ML model that is part of an error correction agent. The results of using the error correction prompt 1100 on the ML model may be corrected SQL code snippets and associated reasoning for the corrections.

FIG. 12 is an example of a machine generated regeneration prompt in accordance with some embodiments. Regeneration prompt 1200 may be generated and enhanced by an SQL generation system. In some embodiments, regeneration prompt 1200 is generated and enhanced in response to feedback from a user after an initial user input from the user has been addressed.

Regeneration prompt 1200 comprises a prompt for an ML model for regenerating an SQL code snippet, code for visualizations, code for analysis, or any other output associated with an SQL generation system. The {{feedback}} key includes any feedback provided by the user in response to receiving output from an SQL generation system. In some embodiments, the {{DATE_INFO}} key includes any temporal data associated with any user input and/or feedback.

This may be used to narrow down an SQL response. The {{DB_SCHEMA}} key is enhanced with the schema of the database that an SQL code snippet was directed to. The {{user_question}} key may be enhanced with original user input that resulted in the generation of an SQL code snippet. The {{SQL_QUERY}} key is enhanced with SQL code which is requested to be regenerated. In some embodiments, regeneration prompt 1200 includes a directive to the ML model for structure of the response and further instructions.

FIG. 13 is an example of a machine generated graph generation prompt in accordance with some embodiments. Graph generation prompt 1300 may be generated and enhanced by an SQL generation system. In some embodiments, graph generation prompt 1300 is generated and enhanced in response to a request of a user to generate a visualization of results (e.g., data generated by executing an SQL code snippet). In some embodiments, graph generation prompt 1300 is automatically generated when it is determined that producing a data visualization will provide a user with valuable insights. An enhanced graph generation prompt 1300 may be used on an ML model to generate visualizations.

In some embodiments, an SQL generation system automatically converts raw data into a programming language specific data structure such as a Pandas™ DataFrame. As shown in this example, a Pandas™ DataFrame is provided in a graph generation prompt. The {{previous_code}} and {{previous_error}} keys comprise information about prior attempts to generate a visualization. In some embodiments, the prior attempts were successful, but a user is providing further feedback to generate a modified visualization. The {{user_question}} key may be enhanced with original user input that resulted in the generation of an SQL code snippet and/or a request for a specific visualization. The {{current_term}} key may be enhanced with a specific term that the user would like the ML model to focus on. Similarly, the {{start_date}} and {{end_date}} keys may be enhanced with temporal periods that the user would like the ML model to focus on.

Graph generation prompt 1300 may also include rules for the ML model in the <RULE> tag. Graph generation prompt 1300 may also include instructions for the ML model associated with formatting the output.

FIG. 14 is an example of a visualization in accordance with some embodiments. Visualization 1400 may be generated by an SQL generation system. In the example shown, an output associated with data visualization capabilities and with analytical capabilities is displayed. In some embodiments, visualization 1400 is generated through user input/feedback or automatically. In some embodiments, visualization 1400 is generated using corrected or regenerated results.

Data visualization feature 1402 demonstrates an example output of a visualization task. In some embodiments, the visualization task is executed by a graphing agent. Analysis visualization feature 1404 demonstrates an example output of an analytical task. In some embodiments, an analytical task is executed by an analysis agent.

In some embodiments, the visualization is generated using a programming language such as Python™. The user may receive the code used to generate the visualization (e.g., Python™ script for generating a graph) and the visualization itself. In some embodiments, the user receives the visualization as a picture format, such as JPEG, PNG, PDF, etc.

In this example, a trend of data is visualized using a linear graph. Furthermore, a forecast is generated and visualized on the graph. The forecast may be generated using any analytical method described herein.

Figure 15:
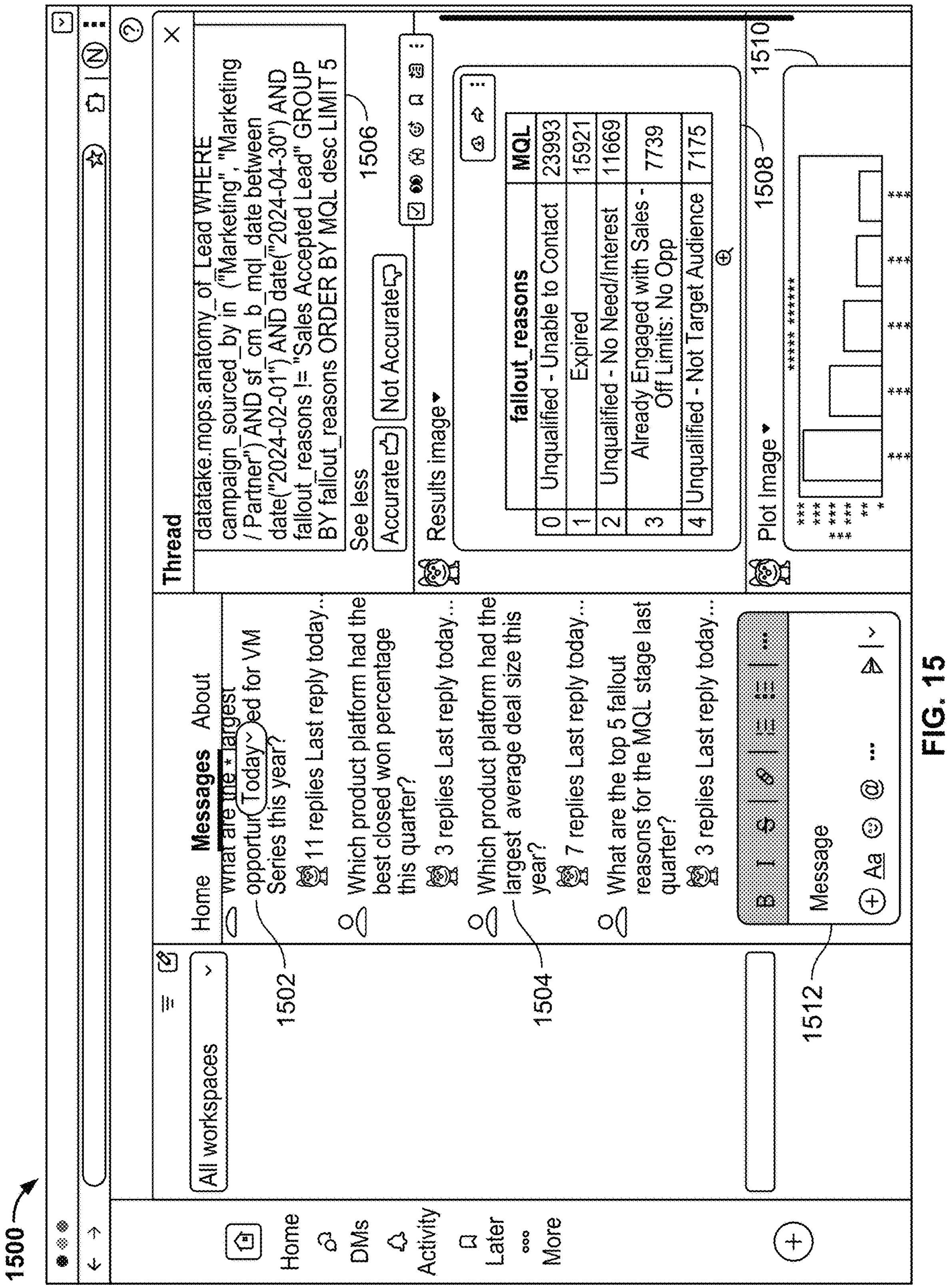
FIG. 15 is an example of a user interface for an SQL generation system in accordance with some embodiments.

FIG. 15 is an example of a user interface for an SQL generation system in accordance with some embodiments. This example displays a chatbot-like user interface for an SQL generation system, however, users may interact with the SQL generation system in any manner, such as through an Application Programming Interface (API).

Initial user input 1502 is an example of a user input that may be sent to an SQL generation system. SQL code snippet 1506 is an example of an SQL code snippet that may be generated by an SQL generation system in response to a user input. SQL code snippet 1506 may also be generated in response to user feedback after an initial user input. User feedback 1504 is an example of such user feedback. Table 1508 is another example of a visualization that may be generated by an SQL generation system. In this example, the visualization is generated automatically, e.g., without a direction from the user. Visualization 1510 is another example of a visualization in the form of a bar graph. Message input 1512 is an example of a user interface for interacting with an SQL generation system. A user may enter any natural language prompts into message input 1512, including user input and feedback. User interface 1500 is merely an example of an SQL generation system. The techniques disclosed herein allow for many more possibilities associated with SQL generation, as described.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
- detecting an intent associated with a user input, comprising:
  - generating intent detection prompt;
  - using the intent detection prompt on a large language model (LLM);
  - embedding user input; and
  - retrieving related question/query examples using the embedded user input on an embedding model;
- generating an augmented prompt for generating a Standard Query Language (SQL) code snippet, comprising:
  - generating an initial augmented prompt based on output of the detecting of the intent; and
  - performing one or more of the following:
  - A) modifying the initial augmented prompt to generate the augmented prompt, comprising:
    - including one or more schema in the initial augmented prompt to generate the augmented prompt; and/or
  - B) modifying the initial augmented prompt to generate the augmented prompt, comprising:
    - excluding at least one schema in the initial augmented prompt to generate the augmented prompt;
- generating the SQL code snippet by using the augmented prompt on a machine learning (ML) model; and
- generating a result by executing the SQL code snippet on a data lake.

2. The method of claim 1, further comprising receiving the user input.

3. The method of claim 1, wherein one or more ML models include one or more Large Language Models (LLMs).

4. The method of claim 1, further comprising generating and enhancing one or more machine generated prompts for use on one or more ML models.

5. The method of claim 1, wherein detecting the intent associated with the user input further comprises:

generating an intent detection prompt; and using the intent detection prompt on another ML model.

6. The method of claim 1, further comprising:

receiving results by executing the SQL code snippet on the data lake;

detecting errors in the results of executing the SQL code snippet on the data lake;

in response to a determination that there is an SQL error present in the results:

generating an error correction prompt;

generating a corrected SQL code snippet by using the error correction prompt on another ML model; and generating corrected results by executing the corrected SQL code snippet on the data lake.

7. The method of claim 1, further comprising:

determining whether it is appropriate to visualize results; and in response to a determination that it is appropriate to visualize the results:

generating a graph generation prompt; and generating a visualization by using the graph generation prompt on another ML model.

8. The method of claim 1, further comprising:

determining whether it is appropriate to analyze results;

in response to a determination that it is appropriate to analyze the results:

determining whether an appropriate tool has been identified; and in response to a determination that the appropriate tool has been identified:

generating an analytics prompt;

using the analytics prompt on another ML model; and in response to a determination that requirements are met, generating analysis by executing the appropriate tool on the results with the given requirements.

9. The method of claim 1, further comprising:

soliciting feedback of a user; and in response to a determination that the user provides feedback regarding returned outputs:

generating a regeneration prompt;

generating a regenerated SQL code snippet by using the regeneration prompt on the ML model; and regenerating results by executing the regenerated SQL code snippet on the data lake.

10. The method of claim 1, further comprising determining an optimal result by:

generating a plurality of augmented prompts for generating SQL code snippets;

generating a plurality of SQL code snippets by using each of the plurality of augmented prompts using two or more ML models;

generating a plurality of results by executing the plurality of SQL code snippets on the data lake; and determining the optimal result by comparing the plurality of results.

11. The method of claim 10, further comprising returning an output associated with the optimal result.

12. The method of claim 10, wherein determining the optimal result by comparing the plurality of results further comprises determining a result with a highest consensus amongst an ensemble of experts.

13. A system, comprising:

a processor configured to:

detect an intent associated with a user input, comprising to:

generate intent detection prompt;

use the intent detection prompt on a large language model (LLM):

embed user input; and retrieve related question/query examples using the embedded user input on an embedding model;

generate an augmented prompt for generating a Standard Query Language (SQL) code snippet, comprising to:

generate an initial augmented prompt based on output of the detecting of the intent; and perform one or more of the following:

A) modify the initial augmented prompt to generate the augmented prompt, comprising to:

include one or more schema in the initial augmented prompt to generate the augmented prompt; and/or B) modify the initial augmented prompt to generate the augmented prompt, comprising to:

exclude at least one schema in the initial augmented prompt to generate the augmented prompt;

generate the SQL code snippet by using the augmented prompt on a machine learning (ML) model; and generate a result by executing the SQL code snippet on a data lake, a memory coupled to the processor and configured to provide the processor with instructions.

14. The system of claim 13, wherein the processor is further configured to receive the user input.

15. The system of claim 13, wherein one or more ML models include one or more Large Language Models (LLMs).

16. The system of claim 13, wherein the processor is further configured to:

generate an intent detection prompt; and use the intent detection prompt on another ML model.

17. The system of claim 13, wherein the processor is further configured to:

receive results by executing the SQL code snippet on the data lake;

detect errors in the results of executing the SQL code snippet on the data lake; and in response to a determination that there is an SQL error present in the results:

generate an error correction prompt;

generate a corrected SQL code snippet by using the error correction prompt on the ML model; and generate corrected results by executing the corrected SQL code snippet on the data lake.

18. The system of claim 13, wherein the processor is further configured to:

determine whether it is appropriate to visualize results; and in response to a determination that it is appropriate to visualize the results:

generate a graph generation prompt; and generate a visualization by using the graph generation prompt on an ML model.

19. The system of claim 13, wherein the processor is further configured to:

generate a plurality of augmented prompts for generating SQL code snippets;

generate a plurality of SQL code snippets by using each of the plurality of augmented prompts using two or more ML models;

generate a plurality of results by executing the plurality of SQL code snippets on the data lake; and determine the optimal result by comparing the plurality of results.

20. A computer program product embodied in a non-transitory computer readable medium and comprising computer instructions for:

detecting an intent associated with a user input, comprising:

generating intent detection prompt;

using the intent detection prompt on a large language model (LLM);

embedding user input; and retrieving related question/query examples using the embedded user input on an embedding model;

generating an augmented prompt for generating a Standard Query Language (SQL) code snippet, comprising:

generating an initial augmented prompt based on output of the detecting of the intent; and performing one or more of the following:

A) modifying the initial augmented prompt to generate the augmented prompt, comprising:

including one or more schema in the initial augmented prompt to generate the augmented prompt; and/or B) modifying the initial augmented prompt to generate the augmented prompt, comprising:

excluding at least one schema in the initial augmented prompt to generate the augmented prompt;

generating the SQL code snippet by using the augmented prompt on a machine learning (ML) model; and generating a result by executing the SQL code snippet on a data lake.

* * * * *